US012559390B2

(12) United States Patent
Alissa et al.

(10) Patent No.: US 12,559,390 B2
(45) Date of Patent: Feb. 24, 2026

(54) SURFACE-MODIFIED ACTIVATED CARBON, METHOD OF PRODUCING SURFACE-MODIFIED ACTIVATED CARBON AND METHOD FOR REMOVING IMPURITY FROM SUBTERRANEAN WELL

(71) Applicant: SAUDI ARABIAN OIL COMPANY, Dhahran (SA)

(72) Inventors: Faisal Mohammed Alissa, Dammam (SA); Abdulaziz A. Alaboud, Dhahran (SA); Saroj Kumar Panda, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 714 days.

(21) Appl. No.: 17/812,185

(22) Filed: Jul. 13, 2022

(65) Prior Publication Data

US 2024/0018018 A1     Jan. 18, 2024

(51) Int. Cl.
B01J 20/30 (2006.01)
C02F 1/28 (2023.01)
C02F 101/30 (2006.01)

(52) U.S. Cl.
CPC .............. C02F 1/281 (2013.01); C02F 1/288 (2013.01); *C02F 2101/30* (2013.01)

(58) Field of Classification Search
CPC ...... C02F 1/281; C02F 2101/30; C02F 1/283; C02F 1/28–288; C02F 1/58; C02F 1/60;
(Continued)

(56) References Cited

U.S. PATENT DOCUMENTS 10,086,359 B1    10/2018    Hernandez-Maldonado et al.

FOREIGN PATENT DOCUMENTS

EP        1103523 B1        1/2010

OTHER PUBLICATIONS

Removal of aluminum, iron and manganese ions from industrial wastes using granular activated carbon and Amberlite IR-120H, Gober et. al (Year: 2015).*
(Continued)

*Primary Examiner* — In Suk C Bullock
(74) *Attorney, Agent, or Firm* — Osha Bergman Watanabe & Burton LLP

(57)        ABSTRACT
A surface-modified activated carbon includes activated carbon, a plurality of sulfonate groups, and a plurality of metal atoms. The sulfonate groups are chemically bonded to the activated carbon, and the metal atoms are independently chemically bonded to the sulfonate groups. The surface-modified activated carbon has a net positive charge. A method for producing a surface-modified activated carbon includes mixing activated carbon with a sulfur-containing compound including sulfonate groups, chemically bonding the sulfonate groups the activated carbon to produce sulfonated activated carbon, combining the sulfonated activated carbon with a solution containing metal atoms, and chemically bonding the metal atoms to the sulfonate group. A method for removing an impurity in a subterranean well includes introducing a surface-modified activated carbon into the subterranean well containing a produced water containing an impurity, contacting the impurity with the surface-modified activated carbon, and adsorbing the impurity with the surface-modified activated carbon.

19 Claims, 21 Drawing Sheets

$CH_3OH/MCl_n$
Dry in Oven
90°C

(58) Field of Classification Search
CPC ........ C02F 1/62; C02F 1/64; C02F 1/68–688;
C02F 2101/20–22
See application file for complete search history.

(56) References Cited

OTHER PUBLICATIONS

Electrophilic Aromatic Substitutions of Amine and Sulfonate onto Fine-Grained Activated Carbon for Aqueous-Phase Metal Ion Removal, Yantasee et. al, 2004.*

Introduction to X-ray Photoelectron Spectroscopy, Stevie et al., 2020.*

Wo2013169811A2, Mennell et. al. (Year: 2013).*

Enhanced adsorption of cationic dyes using sulfonic acid modified activated carbon, Goswami et. al, 2017.*

Aldana-Perez, A., et al., "Sulfonic groups anchored on mesoporous carbon Starbons-300 and its use for the esterification of oleic acid", Fuel, ScienceDirect, Elsevier Ltd., vol. 100, 2012, pp. 128-138 (11 pages).

Alissa, Faisal M., et al., "Synthesis of highly efficient asphalt-based carbon for adsorption of polycyclic aromatic hydrocarbons and diesel from emulsified aqueous phase", Carbon Letters, Springer, Feb. 2020 (13 pages).

Ayawei, Nimibofa, et al., "Modelling and Interpretation of Adsorption Isotherms", Journal of Chemistry, Hindawi, vol. 2017, Article ID 3039817, 2017, pp. 1-11 (11 pages).

Efiyanti, Lisna, et al., "Synthesis and Application of a Sulfonated Carbon Catalyst for a Hydrolisis Reaction", Indonesian Journal of Science & Technology, vol. 5, Issue 3, Dec. 2020, pp. 410-420 (11 pages).

Farouq, Rania and N.S. Yousef, "Equilibrium and Kinetics Studies of adsorption of Copper (II) Ions on Natural Biosorbent", International Journal of Chemical Engineering and Applications, vol. 6, No. 5, Oct. 2015, pp. 319-324 (6 pages).

Ferreira, Aurelia R.O., et al., "Sulfonated activated carbons as potential catalysts for biolubricant synthesis", Molecular Catalysis, ScienceDirect, Elsevier B.V., vol. 488, No. 110888, 2020, pp. 1-8 (8 pages).

Geise, Geoffrey M., et al., "Characterization of Aluminum-Neutralized Sulfonated Styrenic Pentablock Copolymer Films", I&EC Research, ACS Publications, vol. 52, 2013, pp. 1056-1068 (13 pages).

Geremew, Tewodros, "Catalytic Oxidation of Phenol in Aqueous Solution using Fe—Sulfontated Carbon Catalyst", The School of Chemical and Bio Engineering, Addis Ababa Institute of Technology, Addis Ababa University, Jul. 2018, (109 pages).

Ghorbanian, Sohrab A., et al., "Investigation of Adsorption Isotherms of Benzoic Acid on Activated Carbon", 1st National Conference on Industrial Water and Wastewater Treatment, URL: <https://civilica.com/doc/181887>, 2012, pp. 1-5 (5 pages).

Hamdaoui, Oualid and Emmanuel Naffrechoux, "Modeling of adsorption isotherms of phenol and chlorophenols onto granular activated carbon Part I. Two-parameter models and equations allowing determination of thermodynamic parameters", Journal of Hazardous Materials, ScienceDirect, Elsevier B.V., vol. 147, 2007, pp. 381-394 (14 pages).

Hara, Michikazu, et al., "A Carbon Material as a Strong Protonic Acid", Angewandte Chemie International Edition, Wiley-VCH Verlag Gmbh & Co. KGaA, vol. 43, 2004, pp. 2955-2958 (4 pages).

Li, Jinze, et al., "Aluminum-Cycle Ion Exchange Process for Hardness Removal: A New Approach for Sustainable Softening", Environmental Science and Technology, ACS Publications, pp. A-H (8 pages).

Liu, Zhigang, et al., "A new regeneration approach to cation resins with aluminum salts: application of desalination by its mixed bed", Frontiers of Environmental Science and Engineering, vol. 6, No. 1, 2012, pp. 45-50 (6 pages).

Liu, Tiantian, et al., "Preparation and characterization of biomass carbon-based solid acid catalyst for the esterification of oleic acid with methanol", Bioresource Technology, ScienceDirect, Elsevier Ltd., vol. 133, 2013, pp. 618-621 (4 pages).

Mateo, Wendy, et al., "Synthesis and Characterization of Sulfonated Activated Carbon as a Catalyst for Bio-jet Fuel Production from Biomass and Waste Plastics", 2019, doi: https://doi.org/10.1016/j.biortech.2019.122411, pp. 1-34 (35 pages).

Robati, Dariush, "Pseudo-second-order kinetic equations for modeling adsorption systems for removal of lead ions using multi-walled carbon nanotube", Journal of Nanostructure in Chemistry, Springer, vol. 3, No. 55, 2013, pp. 1-6 (6 pages).

Samarghandi, M.R., et al., "Two-Parameter Isotherms of Methyl Orange Sorption by Pinecone Derived Activated Carbon", Iranian Journal of Environmental Health, Science and Engineering, Iranian Association of Environmental Health, vol. 6, No. 4, 2009, pp. 285-294 (10 pages).

* cited by examiner

FIG. 1B

| 10/22/2020 | HV | mag☐ | WD | Spot | dot | ———— 1 mm ———— |
|---|---|---|---|---|---|---|
| 10:35:27 AM | 5.00 kv | 119X | 13.1 mm | 6.0 | ETD | HiRes Gold on Carbon |

| 10/22/2020 | HV | mag☐ | WD | Spot | dot | ——— 200 µm ——— |
|---|---|---|---|---|---|---|
| 11:08:23 AM | 5.00 kv | 511X | 13.1 mm | 6.0 | ETD | HiRes Gold on Carbon |

| 10/22/2020 11:33:10 AM | HV 5.00 kv | mag☐ 144X | WD 13.1 mm | Spot 6.0 | dot ETD | ———— 500 µm ———— HiRes Gold on Carbon |

| 10/22/2020 11:37:27 AM | HV 5.00 kv | mag☐ 524X | WD 11.8 mm | Spot 6.0 | dot ETD | ——— 200 µm ——— HiRes Gold on Carbon |

| 10/22/2020 1:35:38 PM | HV 5.00 kv | mag☐ 175X | WD 12.3 mm | Spot 6.0 | dot ETD | ——— 500 μm ——— HiRes Gold on Carbon |

| 10/22/2020 1:41:01 PM | HV 5.00 kv | mag☐ 471X | WD 12.3 mm | Spot 6.0 | dot ETD | ——— 200 μm ——— HiRes Gold on Carbon |

| 10/22/2020 1:31:14 PM | HV 5.00 kv | mag☐ 201X | WD 12.6 mm | Spot 6.0 | det ETD | ———— 500 μm ———— HiRes Gold on Carbon |

| 10/22/2020 1:33:30 PM | HV 5.00 kv | mag☐ 526X | WD 12.9 mm | Spot 6.0 | det ETD | ———— 200 μm ———— HiRes Gold on Carbon |

Temkin Model - SO3-AC $Y = 1692.9x - 10587$
$R^2 = 0.9801$ ln (Ce)

1

SURFACE-MODIFIED ACTIVATED CARBON, METHOD OF PRODUCING SURFACE-MODIFIED ACTIVATED CARBON AND METHOD FOR REMOVING IMPURITY FROM SUBTERRANEAN WELL

BACKGROUND

Treatment of contaminated fluid, such as wastewater, is often conducted with activated carbon. In particular, activated carbon may be effective in the removal of organic compounds through an adsorption process. However, activated carbon is generally hydrophobic and may favor the adsorption of non-polar organic compounds, such as benzene, toluene, ethyl benzene and xylenes. Therefore, efficient removal of polar organic compounds, such as phenolic compounds, with activated carbon may be challenging, in case the contaminated fluid contains both polar and non-polar organic compounds. Accordingly, there exists a need for continuous improvement of an adsorbent material for contaminated fluid treatment.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a surface-modified activated carbon including activated carbon, a plurality of sulfonate groups, and a plurality of metal atoms. Each of the plurality of sulfonate groups is chemically bonded to a surface of the activated carbon, each of the plurality of metal atoms is independently chemically bonded to at least one of the plurality of sulfonate groups, and the surface-modified activated carbon has a net positive charge.

In another aspect, embodiments disclosed herein relate to a method for producing a surface-modified activated carbon. The method includes mixing activated carbon with a sulfur-containing compound comprising a sulfonate group, and chemically bonding each of the sulfonate group to a surface of the activated carbon to produce sulfonated activated carbon. The method also includes combining the sulfonated activated carbon with a solution containing a plurality of metal atoms, and chemically bonding each of the plurality of metal atoms independently with at least one of the sulfonate group of the sulfonated activated carbon to produce the surface-modified activated carbon.

In another aspect, embodiments disclosed herein relate to a method for removing an impurity in a subterranean well. The method includes introducing a surface-modified activated carbon into the subterranean well containing a produced water comprising the impurity, contacting the impurity with the surface-modified activated carbon, and adsorbing the impurity with the surface-modified activated carbon. The surface-modified activated carbon includes activated carbon, a plurality of sulfonate groups, and a plurality of metal atoms. Each of the plurality of sulfonate groups is chemically bonded to a surface of the activated carbon, and each of the plurality of metal atoms is independently chemically bonded to at least one of the plurality of sulfonate groups.

Other aspects and advantages of the claimed subject matter will be apparent from the following description and the appended claims.

BRIEF DESCRIPTION OF DRAWINGS

FIG. 1B is a schematic diagram illustrating an exemplary reaction between sulfonated activated carbon and metal atoms to produce surface-modified activated carbon in accordance with one or more embodiments.

DETAILED DESCRIPTION

Figure 1A:
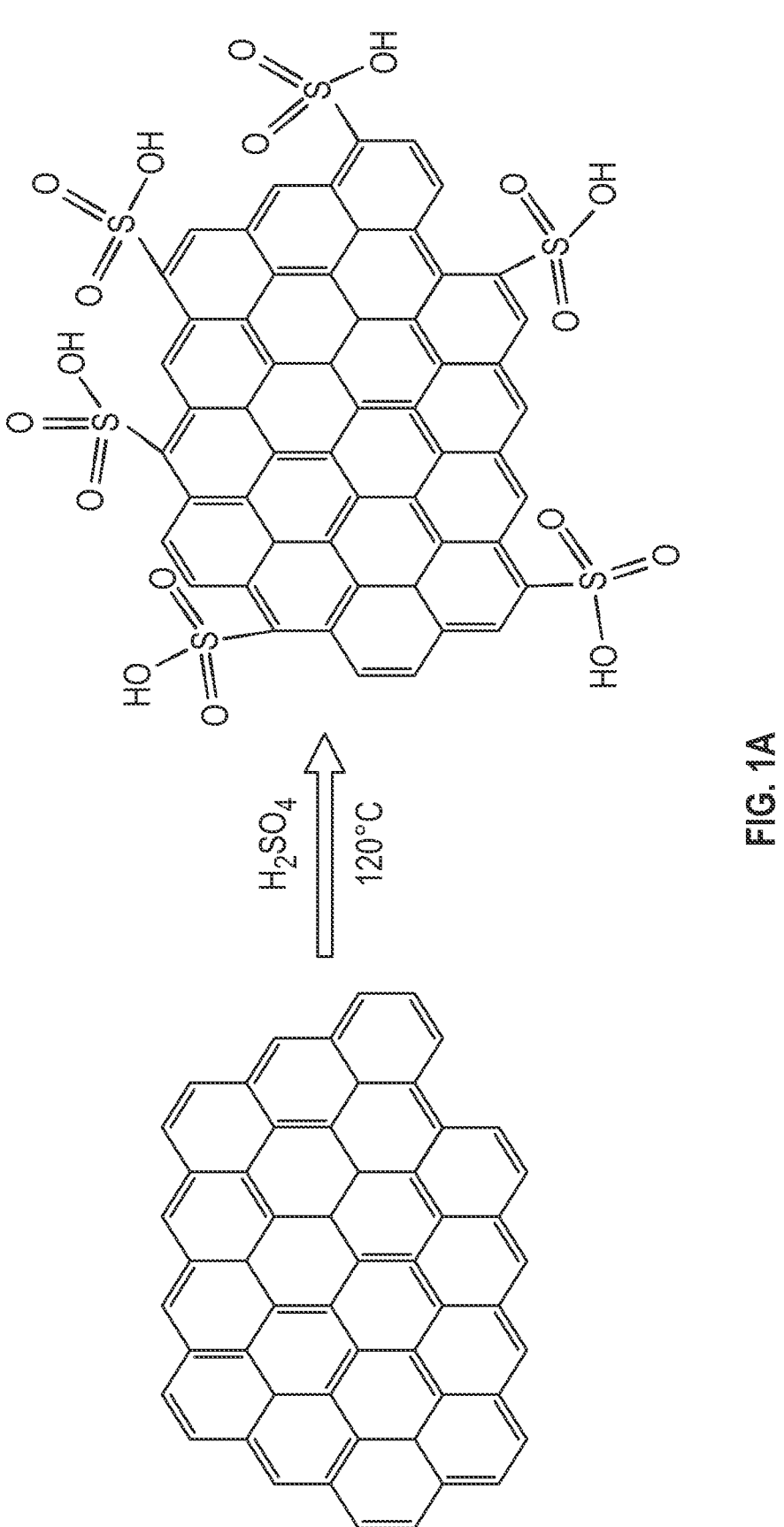
FIG. 1A is a schematic diagram illustrating an exemplary reaction between activated carbon and a sulfur-containing compound to produce sulfonated activated carbon in accordance with one or more embodiments.

The present disclosure generally relates to a surface-modified activated carbon, and a method for producing the surface-modified activated carbon ("surface-modified AC"). The surface-modified AC may comprise activated carbon, a plurality of sulfonate groups and a plurality of metal atoms. Each of the plurality of sulfonate groups are chemically bonded to a surface of the activated carbon, and each of the plurality of metal atoms are independently chemically bonded to at least one of the plurality of sulfonate groups.

Surface-Modified Activated Carbon

In one or more embodiments, the surface-modified AC comprises activated carbon, a plurality of sulfonate groups and a plurality of metal atoms.

As used herein, "activated carbon" refers to a carbon material that is processed to have high surface area and pore volume. As used herein, an activated carbon ("AC") may have a surface area of from about 500 $m^2/g$ to about 3000 $m^2/g$. In one or more embodiments, the activated carbon included in the surface-modified AC is an activated carbon that can be used as an adsorbent and is derived from a carbonaceous raw material.

In one or more embodiments, the activated carbon is in a powder form. The activated carbon in a powder form may have a bulk density, also termed apparent density, in the range of about 0.2 to about 0.8 g/mL, such as a lower limit selected from any one of 0.2, 0.25, and 0.3 g/mL to an upper limit selected from any one of 0.70, 0.75 and 0.8 g/mL, where any lower limit may be paired with any upper limit.

In one or more embodiments, the activated carbon may include particles having a roughly spherical shape, or they may be irregular in shape. In one or more embodiments, the activated carbon particles have an average particle size with a lower limit of any one of 10, 12, 15, 17, 20, 21, 22, 23, 24, 25, and 26 microns and an upper limit of any one of 24, 25, 26, 27, 28, 29, 30, 32, 35, 38, 40, 42, 45, 47, and 50 microns, where any lower limit can be used in combination with any mathematically-compatible upper limit.

In one or more embodiments, the surface-modified AC comprises a plurality of sulfonate groups. Each of the plurality of sulfonate groups may be chemically bonded to a surface of the activated carbon. The sulfonate groups may have a general formula $—SO_3$.

In one or more embodiments, the surface-modified AC comprises a plurality of metal atoms. Each of the plurality of the metal atoms may be independently chemically bonded to at least one of the plurality of the sulfonated groups, which are chemically bonded to the activated carbon. In one or more embodiments, each metal atom is chemically bonded to a single sulfonated group, or chemically bonded singly to one of the plurality of sulfonate group. In such a case, the metal atom may be positively charged, which results in the surface-modified activated carbon to have a net positive charge. In one or more embodiments, the plurality of metal atoms include at least one of aluminum atoms and iron atoms. In one or more embodiments, the surface-modified AC is aluminum-modified sulfonated activated carbon ("AC-$SO_3$—Al") comprising activated carbon, a plurality of sulfonate groups, and a plurality of aluminum atoms. In one or more embodiments, the surface-modified AC is iron-modified sulfonated activated carbon ("AC-$SO_3$—Fe") comprising activated carbon, a plurality of sulfonate groups, and a plurality of iron atoms.

In one or more embodiments, the surface-modified AC comprises carbon in an amount of from about 75 to about 99 wt %, such as a lower limit selected from any one of 80 and 85 wt % to an upper limit selected from any one of 90, 95, and 99 wt %, where any lower limit may be paired with any upper limit. Activated carbon used to produce the surface-modified AC may comprise carbon in an amount up to 100 wt %. Due to the addition of sulfonate groups and metal atoms, the surface-modified AC comprises carbon in an amount of less than 100 wt %.

In one or more embodiments, the surface-modified AC comprises sulfur in an amount of from about 0.5 to about 5.0 wt %, such as a lower limit selected from any one of 1.0, and 1.5 wt % to an upper limit selected from any one of 4.0, 4.5, and 5.0 wt %, where any lower limit may be paired with any upper limit.

In one or more embodiments, the surface-modified AC comprises metal in an amount of from about 0.5 to about 5.0 wt %, such as a lower limit selected from any one of 0.5, 1.0, and 1.5 wt % to an upper limit selected from any one of 4.0, 4.5, and 5.0 wt %, where any lower limit may be paired with any upper limit. In one or more embodiments, the amount of metal comprised in the surface-modified AC is similar to the amount of sulfur comprised in the surface-modified AC. Some metals may have weak binding forces and therefore, the amount of metal in the surface-modified AC may be reduced due to the low interaction favorability between the metal and the sulfonated group. In one or more embodiments, aluminum has substantially high interaction favorability.

In one or more embodiments, the surface-modified AC comprises oxygen in an amount of from about 1.5 to about 15.0 wt %, such as a lower limit selected from any one of 1.5, 3.0, and 4.5 wt % to an upper limit selected from any one of 6.0, 10.0, and 15.0 wt %, where any lower limit may be paired with any upper limit. Oxygen may be comprised in the surface-modified AC as a part of the sulfonate group.

Because the sulfonate group contains one sulfur and 3 oxygen atoms, the amount of oxygen contained in the surface-modified AC may be approximately 3 times the amount of sulfur contained in the surface-modified AC.

In one or more embodiments, the surface-modified AC comprises residue components such as chlorine and silicone. "Residue components" refer to components that are unintentionally included in the surface-modified AC. Residue components may be an impurity included in the raw materials used to produce the surface-modified AC, or a residue of a component used during the production of the surface-modified AC. In one or more embodiments, silicone is included as a residue component in the AC used to produce the surface-modified AC. In one or more embodiments, chlorine may be introduced during the production the surface-modified AC in which a solution containing metal and chlorine ions may be contacted with the sulfonated AC. Some chlorine atoms may remain in the surface-modified AC as a residue. In one or more embodiments, the surface-modified AC comprises residue components in an amount of from about 0.0 to about 2.0 wt %, such as a lower limit selected from any one of 0.0, 0.1, 0.2, 0.25, and 0.5 wt %, to an upper limit selected from any one of 0.8, 0.9, 1.0, 1.5, 1.75, and 2.0 wt %, where any lower limit may be paired with any upper limit.

In one or more embodiments, the surface-modified AC has a surface area in a range from about 1000 to about 2500 $m^2/g$, such as a lower limit selected from any one of 1000, 1100, 1200, 1300, 1400 and 1500 $m^2/g$ to an upper limit selected from any one of 2000, 2100, 2200, 2300, 2400 and 2500 $m^2/g$, where any lower limit may be paired with any upper limit. As one of ordinary skill will appreciate, the surface area of the surface-modified AC may be measured with a Brunauer-Emmett-Teller (BET) surface analysis technique.

In one or more embodiments, the surface-modified AC has a maximum adsorption amount of phenol of at least 3000 mg phenol/g of surface-modified AC. In one or more embodiments, the surface-modified AC has a maximum adsorption amount of phenol in a range from about 3000 mg of phenol/g of surface-modified AC to about 10000 mg of phenol/g of surface-modified AC, such as a lower limit selected from any one of 3000, 3500 and 4000 mg of phenol/g of surface-modified AC to an upper limit selected from any one of 5000, 6000, 7000, 8000, 9000 and 10000 mg of phenol/g of surface-modified AC, where any lower limit may be paired with any upper limit. The maximum adsorption amount of phenol is defined as the maximum amount of phenol compound adsorbed by the surface-modified AC when the surface-modified AC is immersed in a solution containing phenol.

In one or more embodiments, the surface-modified AC is aluminum-modified sulfonated activated carbon which has adsorption isotherm properties for phenol as determined by Freundlich's model, and adsorption kinetic properties for phenol as determined by the Pseudo-Second Order (PSO) model. The equations which govern the Freundlich's model and PSO model are provided in the EXAMPLES section below. In one or more embodiments, the aluminum-modified sulfonated activated carbon has an adsorption isotherm properties which is represented by Freundlich's model with Freundlich isotherm constant (K F) in a range from about 35 to about 40 L/g, n in a range from about to about 1 and q m in a range from about 2550 to about 2650, as determined by Equations (3) and (4) included in the EXAMPLES section. In one or more embodiments, the aluminum-modified sulfonated activated carbon has an adsorption kinetic properties which is represented by PSO model, with constants Qe in a range from about 700 to about 4500 mg/g, and $K_{PSO}$ in a range from about 0.00012 to about 0.0015 g/mg*min, as determined by Equation (8) included in the EXAMPLES section.

The surface-modified AC having an adsorption isotherm or adsorption kinetic property "represented by" a specific model is defined as the surface-modified AC having an adsorption isotherm or adsorption kinetic property that highly correlates with a specific model with disclosed parameter/constant ranges. "Highly correlates" is defined as having a coefficient of determination (R 2) of at least 0.980, at least 0.985, at least 0.990, or at least 0.995.

In one or more embodiments, the surface-modified AC is an iron-modified sulfonated activated carbon which has adsorption isotherm properties for phenol as determined by Jovanovic model, and adsorption kinetic properties for phenol as determined by Elovic model. The equations which govern the Jovanovic and Elovic models are provided in the EXAMPLES section below. In one or more embodiments, the iron-modified sulfonated activated carbon has an adsorption isotherm properties which is represented by Jovanovic's model with constants q m in a range from about 2200 to about 2400 and $K_j$ in a range from about −0.002 to about −0.001, as determined by Equation (6) included in the EXAMPLES section. In one or more embodiments, the iron-modified sulfonated activated carbon has an adsorption kinetic properties which is represented by Elovic model, with $\alpha$ in a range from about 50000 to about 7000000, and $\beta$ in a range from about 0.0005 to about 0.002, as determined by Equation (9) included in the EXAMPLES section.

Method for Producing Surface Modified Activated Carbon

The present disclosure relates to a method for producing a surface-modified activated carbon. The method may include mixing activated carbon with a sulfur-containing compound comprising a sulfonate group, chemically bonding each of the sulfonate group to a surface of the activated carbon to produce sulfonated activated carbon ("AC-SO₃"), combining the sulfonated activated carbon with a solution containing a plurality of metal atoms, and independently chemically bonding each of the plurality of metal atoms with at least one of the sulfonate group of the sulfonated activated carbon to produce the surface-modified activated carbon.

In one or more embodiments, the method includes mixing activated carbon with a sulfur-containing compound comprising a sulfonate group. Mixing of activated carbon with the sulfur-containing compound may be conducted with any commonly available methods and equipment, such as a mixer, provided that the process and equipment provide agitation and flow to sufficiently disperse activated carbon in the sulfur-containing compound.

In one or more embodiments, the sulfur-containing compound includes non-concentrated sulfuric acid, concentrated sulfuric acid, sulfonic acid and a solution of sulfur trioxide. The concentration of the sulfur-containing compound may range from about 25 wt % to about 98 wt %, such as a lower limit selected from any one of 25, 30, and 35 wt % to an upper limit selected from any one of 65, 70, 75, 80, 85, 90, 95 and 98 wt %, where any lower limit may be paired with any upper limit.

In one or more embodiments, the sulfur-containing compound is a concentrated sulfuric acid having a sulfuric acid concentration in a range of from about 90 to about 98 wt %, such as a lower limit selected from any one of 90, 91, 92, 93 wt % to an upper limit selected from any one of 96, 97 and 98 wt %, where any lower limit may be paired with any upper limit.

In one or more embodiments, the mixing step is conducted at a temperature in a range of from about 20 to about 150° C., such as a lower limit selected from any one of 20, 30, 40, 50, 60, 70, 80, 90, 100, 105, 110, 115° C. to an upper limit selected from any one of 125, 130, 135, 140, 145 and 150° C., where any lower limit may be paired with any upper limit. In one or more embodiments, the mixing step is conducted at a temperature of 120° C.

In one or more embodiments, the mixing is conducted under a nitrogen blanket. A nitrogen blanketing refers to as a process in which a sufficient amount of gaseous nitrogen is introduced into a container in which the mixing step is taking place, such as a reaction vessel, to eliminate air and/or other gaseous matter to prevent explosions, oxidation or other unwanted effects. Gaseous nitrogen may be introduced continuously or intermittently to obtain adequate nitrogen blanket.

In one or more embodiments, the method includes chemically bonding each of the sulfonate group of the sulfur-containing compound to a surface of the activated carbon to produce sulfonated activated carbon. In one or more embodiments, the entire quantity of sulfonated group available in the sulfur-containing compound may chemically bond to a surface of the activated carbon. In one or more embodiments, a portion of the entire quantity of sulfonated group available in the sulfur-containing compound may chemically bond to the surface of the activated carbon. The amount of sulfonated group chemically bonded to the surface of the activated carbon may depend on the concentration of the sulfur-containing compound, and the amount of sulfur-containing compound mixed with the activated carbon with respect to the amount of activated carbon.

In one or more embodiments, chemically bonding each of sulfonate group of the sulfur-containing compound to a surface of the activated carbon is conducted at a temperature in a range from about 100 to about 150° C., such as a lower limit selected from any one of 100, 105, 110, 115° C. to an upper limit selected from any one of 125, 130, 135, 140, 145 and 150° C., where any lower limit may be paired with any upper limit. In one or more embodiments, the chemically bonding step of the sulfonate group onto a surface of the activated carbon is conducted at a temperature of 120° C. The mixing and chemically bonding the sulfonate group onto a surface of the activated carbon may be conducted simultaneously, or sequentially.

In one or more embodiments, the method includes washing the sulfonated activated carbon with a washing solvent to remove any undesired residues and components. The washing solvent may be a solvent capable of removing such residues and components, and may include, but is not limited to, deionized water, methanol and dichloromethane.

In one or more embodiments, the method includes drying the sulfonated activated carbon. The drying of the sulfonated activated carbon may be conducted by a suitable method and equipment known in the art. The equipment may include an oven, and a 3-neck round bottom flask and a heater, such as a heating mantle, to heat the round bottom flask. In one or more embodiments, drying is conducted at room temperature or an elevated temperature, and under atmospheric pressure, elevated pressure or reduced pressure. In one or more embodiments, drying of the sulfonated activated carbon is conducted in a 3-neck round bottom flask under a nitrogen blanket, in an oven under atmospheric pressure, or combinations thereof. The drying may be conducted at a temperature in a range from about 20 to about 150° C., such as a lower limit selected from any one of 20, 30, 40, 50, 60, 70° C. to an upper limit selected from any one of 100, 110, 120, 130 140 and 150° C., where any lower limit may be paired with any upper limit. In one or more embodiments, drying is conducted at a temperature of 90° C. In one or more embodiments, chemically bonding sulfonate group of the sulfur-containing compound to a surface of the activated carbon is conducted under a nitrogen blanket.

In one or more embodiments, the method includes combining the sulfonated activated carbon with a solution containing a plurality of metal atoms. The combining step may include a process and equipment used in the mixing process, such as a commercially available mixer. In one or more embodiments, the combining may include washing the sulfonated activated carbon with a solution containing a metal salt and a solvent capable of dissolving the metal salt. The metal salt may include, but is not limited to, a metal-chloride salt such as aluminum chloride, iron chloride and the like. In one or more embodiments, methanol is used as the solvent for the solution to wash the sulfonated activated carbon, as methanol is capable of dissolving metal salts such as aluminum chloride and iron (II) chloride.

In one or more embodiments, the solution containing a plurality of metal atoms includes a solution containing iron ions and/or aluminum ions, such as a solution of iron chloride in methanol, and aluminum chloride in methanol.

In one or more embodiments, combining the sulfonated activated carbon with a solution containing a plurality of metal atoms may be conducted at a temperature in a range from about 5° C. to about 50° C., such as a lower limit selected from any one of 5, 10 and 15° C. to an upper limit selected from any one of 40, 45 and 50° C., where any lower limit may be paired with any upper limit.

In one or more embodiments, the method includes chemically bonding each of the plurality of metal atoms independently with at least one of the sulfonate group of the sulfonated activated carbon to produce the surface-modified activated carbon. Bonding of the metal atoms and sulfonate group may occur simultaneously as the sulfonated activated carbon is combined with the solution containing a plurality of metal atoms, or the combining and chemically bonding steps may occur sequentially. In one or more embodiments, chemically bonding each of the plurality of metal atoms independently with at least one of the sulfonate group of the sulfonated activated carbon may be conducted at a temperature in a range from about 5° C. to about 50° C., such as a lower limit selected from any one of 5, 10 and 15° C. to an upper limit selected from any one of 40, 45 and 50° C., where any lower limit may be paired with any upper limit.

Method for Removing an Impurity in a Subterranean Well

The present disclosure also relates to a method for removing an impurity from a subterranean well. The impurity may be removed from the subterranean well by removing the impurity from a fluid in the well, such as produced water, by adsorbing the impurity by the surface-modified activated carbon. Produced water refers to an aqueous fluid produced during the extraction process of oil and gas. In addition to water, produced water may also contain a variety of organic and inorganic matters such as salt, suspended solid matters, oil, metals such as zinc, lead, manganese, iron and barium. The produced water may also include an impurity such as polar organic compounds including phenolic compounds, and non-polar organic compounds such as benzene, toluene, ethyl benzene and xylene. The term "impurity" refers organic compounds contained in the fluid which may be adsorbed the surface-modified AC, and may include polar organic compounds including phenolic compounds, and non-polar organic compounds such as benzene, toluene, ethyl benzene and xylene.

The method may include introducing a surface-modified activated carbon (AC) into the subterranean well containing a produced water comprising the impurity, contacting the impurity with the surface-modified activated carbon, and adsorbing the impurity with the surface-modified activated carbon.

In one or more embodiments, introduction of the surface-modified AC into the subterranean well is be conducted by adding the surface-modified AC to a fluid, such as a drilling fluid or injection fluid, that is being circulated through the subterranean well. In one or more embodiments, the surface-modified AC is added to the subterranean well, and a fluid is added simultaneously with the surface-modified AC, or after the surface-modified AC is added to the subterranean well.

In one or more embodiments, the method includes contacting the impurity in the produced water with the surface-modified AC. The contact between the impurity and surface-modified AC may occur immediately after the surface-modified AC is introduced into the subterranean well, or may occur as the surface-modified AC is flown through the subterranean well.

In one or more embodiments, the method include adsorbing the impurity with the surface modified AC. The adsorption may occur simultaneously with the contacting step, or sequentially. In one or more embodiments, the contacting and adsorbing steps are conducted for a duration in a range from about 1 minutes to about 60 minutes, such as a lower limit selected from one of 1, 2, 3, 4 and 5 minutes, to an upper limit selected from 20, 40, 50 and 60 minutes, where any lower limit may be paired with any upper limit.

EXAMPLES

The following examples are provided to illustrate embodiments of the present disclosure. The Examples are not intended to limit the scope of the present invention, and they should not be so interpreted.

Materials

98% sulfuric acid ($H_2SO_4$) was obtained from Fischer Scientific. Activated carbon was obtained from Kansai Coke & Petrochemicals Ltd. Methanol, dichloromethane and aluminum chloride were obtained from Sigma Aldrich.

Example 1 Synthesis of Sulfonated Activated Carbon

Figure 2:
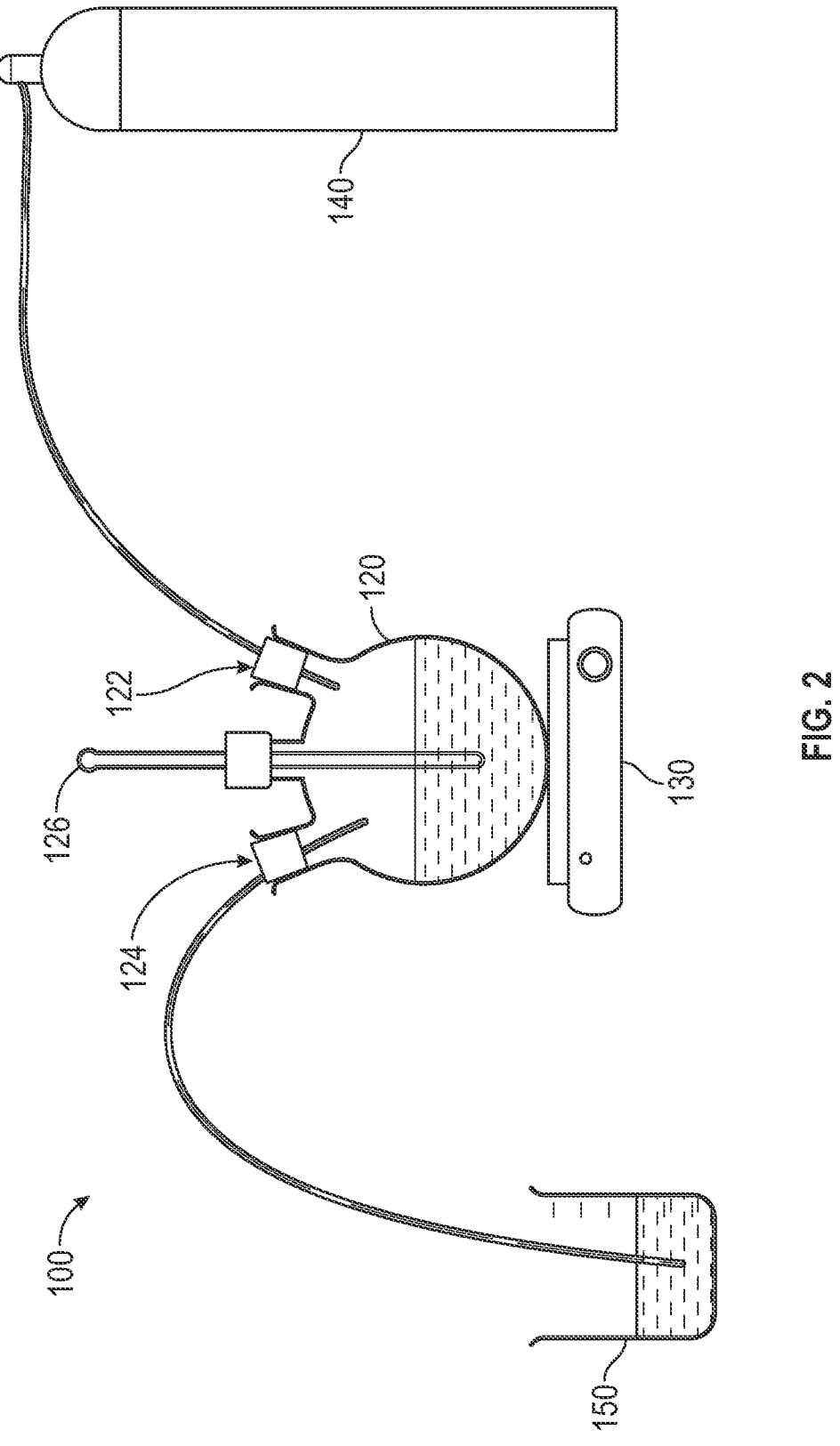
FIG. 2 is a schematic diagram illustrating an exemplary apparatus for the production of sulfonated activated carbon (EXAMPLE 1) in accordance with one or more embodiments.

An exemplary sulfonated activated carbon ("$SO_3$-AC"), which is an intermediate material for the production of the surface-modified activated carbon, was produced by reacting 98% sulfuric acid with activated carbon to attach sulfonate groups ($SO_3H$) on the surface of the activated carbon as shown in FIG. 1A (Scheme 1). FIG. 2 illustrates an exemplary apparatus for the production of $SO_3$-AC. Apparatus 100 includes a 3-neck flask 120, a heater/stirrer 130, nitrogen gas source 140 and a water bath 150. The 3-neck flask 120 includes a nitrogen gas inlet 122, nitrogen gas outlet 124 and a thermometer 126 to monitor the temperature of the content in the 3-neck flask 120. The nitrogen gas inlet 122 is fluidly connected to the nitrogen gas source 140 and the nitrogen gas outlet 124 is fluidly connected to the water bath 150.

98% sulfuric acid and activated carbon were placed in the 3-neck flask 120 along with a magnetic stirring bar. The temperature of the heater/stirrer 130 was adjusted to maintain the temperature of the mixture of sulfuric acid and activated carbon at 120° C. The mixture was stirred with the magnetic bar and heated at 120° C. under nitrogen gas flow for 8 hours. The resulting slurry was removed from the 3-neck flask 120 and washed thoroughly with deionized water, methanol, and then dichloromethane. The washed composition was placed back in the 3-neck flask 120 heated by the heater/stirrer 130 with a set temperature of 110° C., and dried under a nitrogen blanket by continuously introducing nitrogen gas from the nitrogen gas source 140. The actual temperature of the composition in the 3-neck flask 120 was expected to be lower than 110° C. due to the cooling effect of the flowing nitrogen gas. The volatile matter present in the composition and the vessel was removed through the nitrogen gas outlet 124 of the 3-neck flask 120 into the water bath 150. The composition was then placed in an oven set at 90° C. and further dried under atmospheric pressure to obtain the $SO_3$-AC of EXAMPLE 1.

Example 2 Synthesis of Aluminum Modified Sulfonated Activated Carbon

Figure 1B:
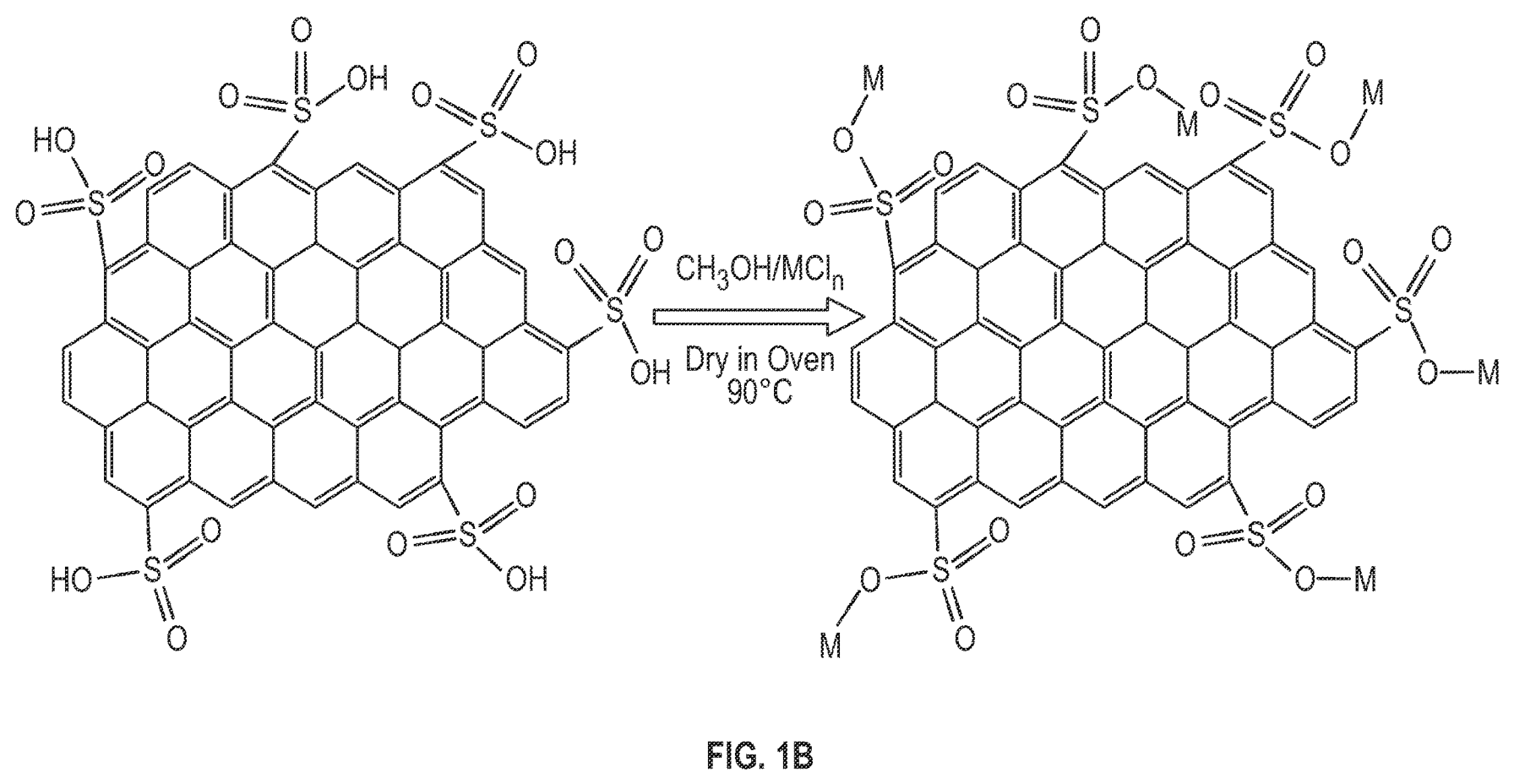

An exemplary surface modified activated carbon, aluminum-modified sulfonated activated carbon ("Al—$SO_3$-AC") was produced by first adding aluminum (III) chloride into a beaker containing methanol, and stirring until aluminum (III) chloride is fully dissolved to produce a solution of methanol and aluminum (III) chloride. 1 gram (g) of $SO_3$-AC of EXAMPLE 1 was then placed in the beaker containing the solution of methanol and aluminum (III) chloride, and the content of the beaker was stirred. As the sulfonic acid group of the activated carbon encounters aluminum, which is a larger atom having a higher positive charge than hydrogen atom or proton, aluminum replaces the proton, producing Al—$SO_3$-AC. The content of the beaker was filtered to collect Al—$SO_3$-AC, and Al—$SO_3$-AC was then dried in the oven at 90° C. to evaporate all remaining methanol. When the sulfonic acid group encounters aluminum, aluminum may attach to more than one sulfonic group, creating a crosslinked structure temporarily. As a sufficient amount of aluminum is provided, each sulfonic acid group becomes attached to a single aluminum atom, resulting in a surface modified activated carbon having a large positively charged molecular structure as illustrated in FIG. 1B (Scheme 2).

Example 3 Synthesis of Iron-Modified Sulfonated Activated Carbon

An exemplary surface modified activated carbon, iron-modified sulfonated activated carbon ("Fe—$SO_3$-AC") was produced by first adding iron (II) chloride into a beaker containing methanol, and stirring until iron (II) chloride is fully dissolved to produce a solution of methanol and iron (II) chloride. 1 gram (g) of $SO_3$-AC of EXAMPLE 1 was then placed in the beaker containing the solution of methanol and iron (II) chloride, and the content of the beaker was stirred. The content of the beaker was filtered to collect Fe—$SO_3$-AC, and Fe—$SO_3$-AC was then dried in the oven at 90° C. to evaporate all remaining methanol.

Material Characterization

The elemental composition of the activated carbon, the $SO_3$-AC of EXAMPLE 1, the Al—$SO_3$-AC of EXAMPLE 2, and the Fe—$SO_3$-AC of EXAMPLE 3 was obtained using Energy Dispersive X-Ray (EDX) through averaging scans of multiple sites for each composition. The results of the EDX analysis are shown in Tables 1A and 1B. A substantial increase in sulfur % of the $SO_3$-AC of EXAMPLE 1, the Al—$SO_3$-AC of EXAMPLE 2, and the Fe—$SO_3$-AC of EXAMPLE 3 indicates that sulfonation of the activated carbon was successful. Furthermore, the presence of metal in a substantial quantity in the Al—$SO_3$-AC of EXAMPLE 2, and the Fe—$SO_3$-AC of EXAMPLE 3 indicates that the surface-modification of activated carbon with aluminum-modified and iron-modified sulfonate group was successful. In addition, the presence of chlorine in the Al—$SO_3$-AC of EXAMPLE 2, and the Fe—$SO_3$-AC of EXAMPLE 3 indicates that the chlorine atom from aluminum (III) chloride solution and iron (II) chloride solution was adsorbed by the surface modified activated carbon.

TABLE 1A

| Material | Carbon % | Oxygen % | Sulfur % | Aluminum % | Iron % |
|---|---|---|---|---|---|
| Activated Carbon (AC) | 97.78 | 1.51 | N/A | N/A | N/A |
| EXAMPLE 1 (AC—$SO_3$) | 88.11 | 8.23 | 2.69 | N/A | N/A |
| EXAMPLE 2 (AC—$SO_3$—Al) | 86.89 | 6.46 | 2.25 | 2.37 | N/A |
| EXAMPLE 3 (AC—$SO_3$—Fe) | 87.04 | 6.21 | 1.94 | N/A | 2.15 |

TABLE 1B

| Material | Silicon % | Chlorine % |
|---|---|---|
| Activated Carbon (AC) | 0.71 | N/A |
| EXAMPLE 1 (AC—$SO_3$) | 0.97 | N/A |
| EXAMPLE 2 (AC—$SO_3$—Al) | 1.45 | 0.58 |
| EXAMPLE 3 (AC—$SO_3$—Fe) | 1.57 | 1.09 |

Figure 3:
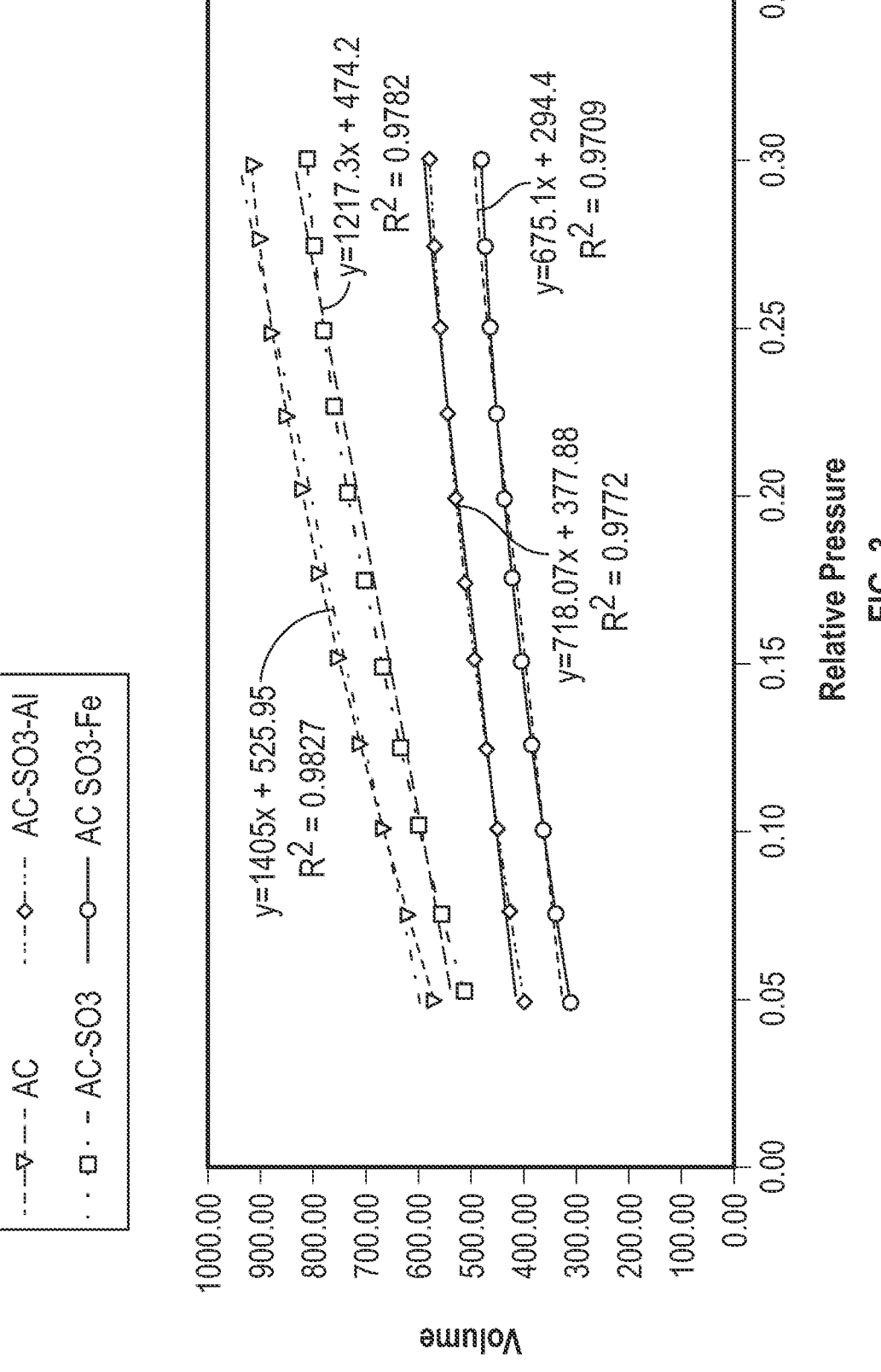
FIG. 3 is a plot of the volume of nitrogen gas adsorbed by activated carbon, a sulfonated activated carbon (EXAMPLE 1), an aluminum-modified activated carbon (EXAMPLE 2), and an iron-modified activated carbon (EXAMPLE 3) with respect to relative pressures of the nitrogen gas, and best-fit lines, in accordance with one or more embodiments.
Figure 4A:
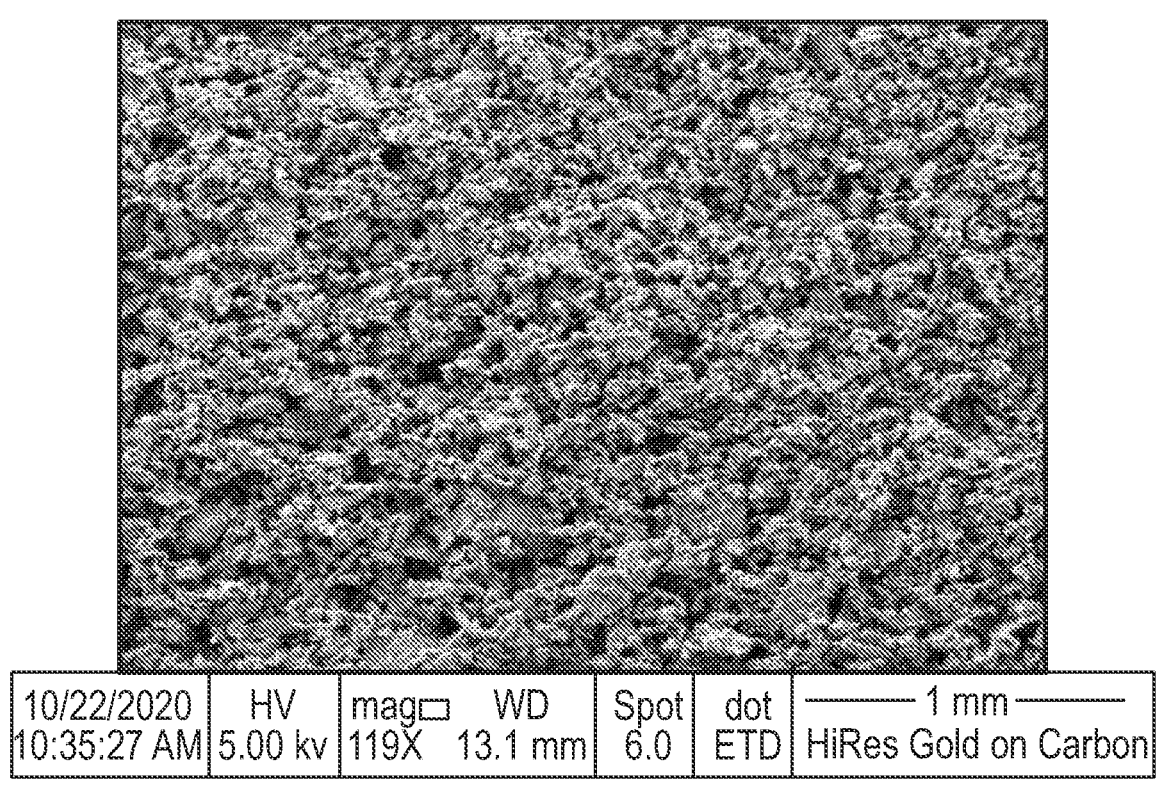
FIG. 4A is a scanning electron microscopic (SEM) image of activated carbon in accordance with one or more embodiments.
Figure 4B:
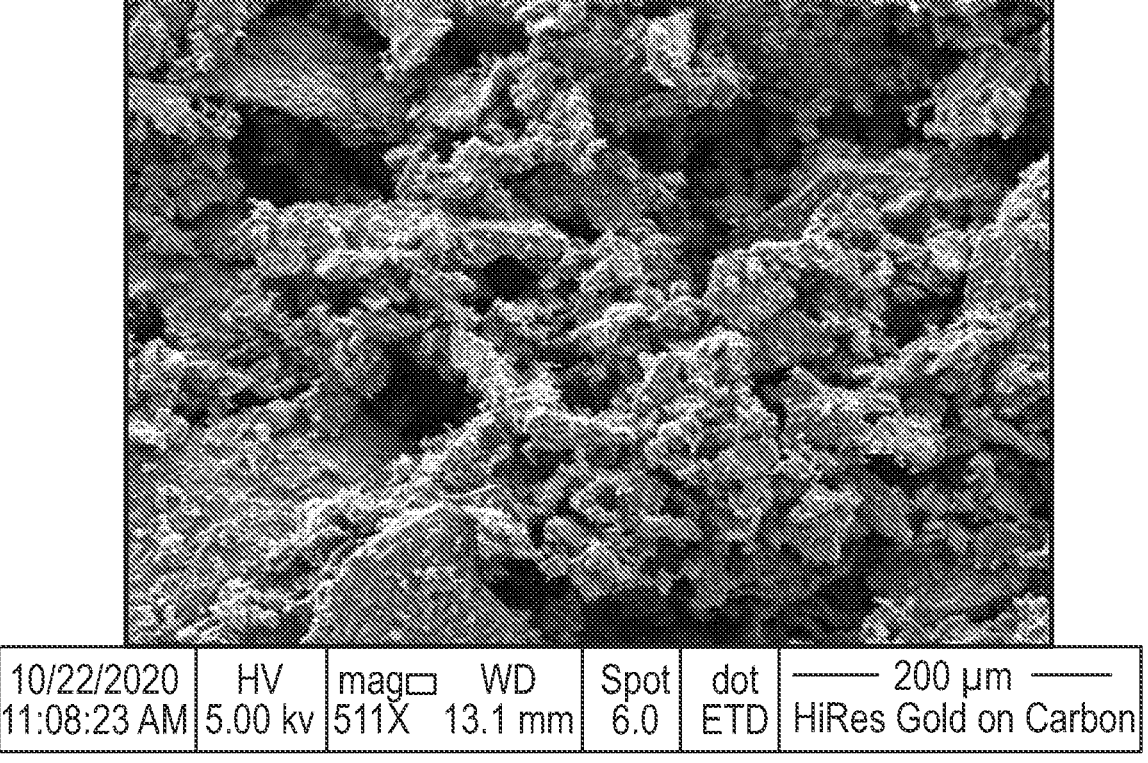
FIG. 4B is another SEM image of activated carbon in accordance with one or more embodiments.
Figure 5A:
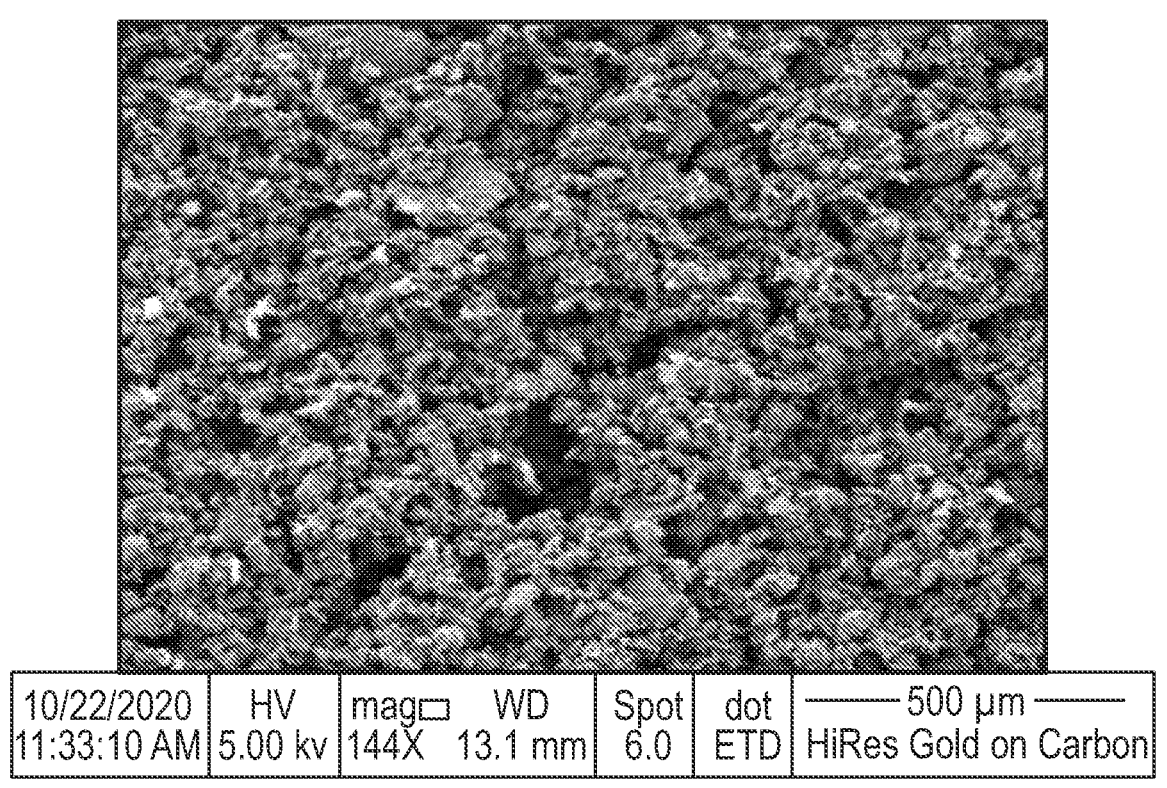
FIG. 5A is an SEM image of a sulfonated activated carbon (EXAMPLE 1) in accordance with one or more embodiments.
Figure 5B:
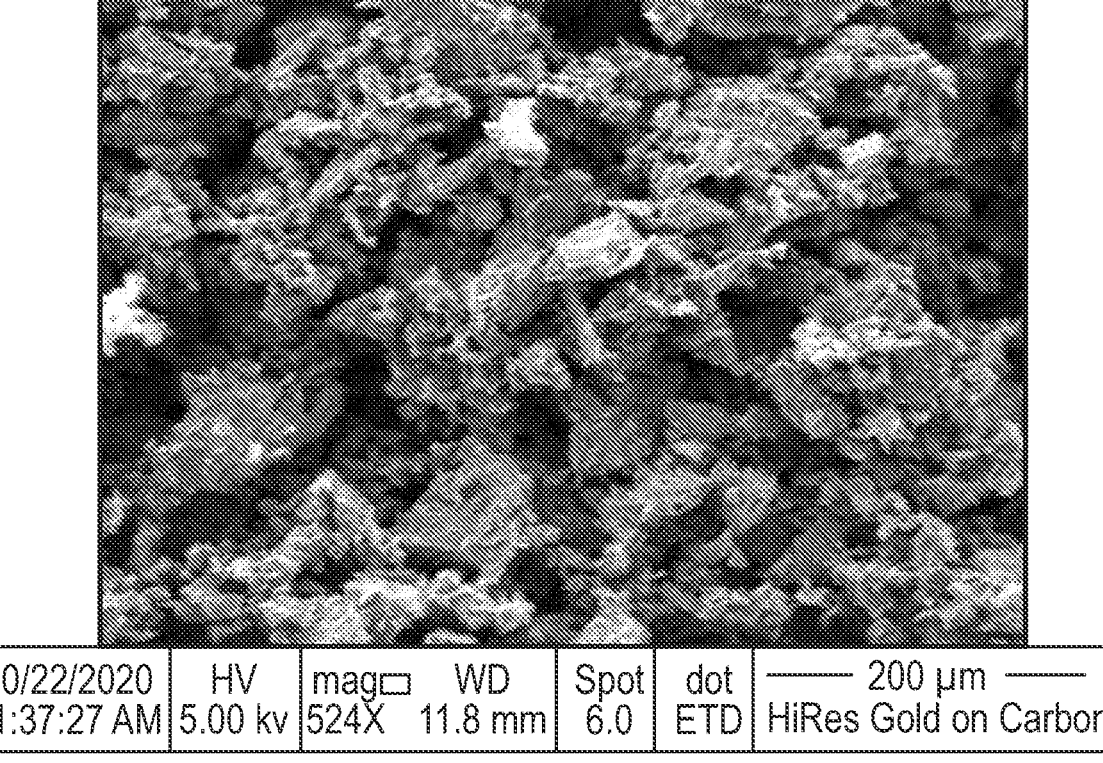
FIG. 5B is another SEM image of a sulfonated activated carbon (EXAMPLE 1) in accordance with one or more embodiments.
Figure 6A:
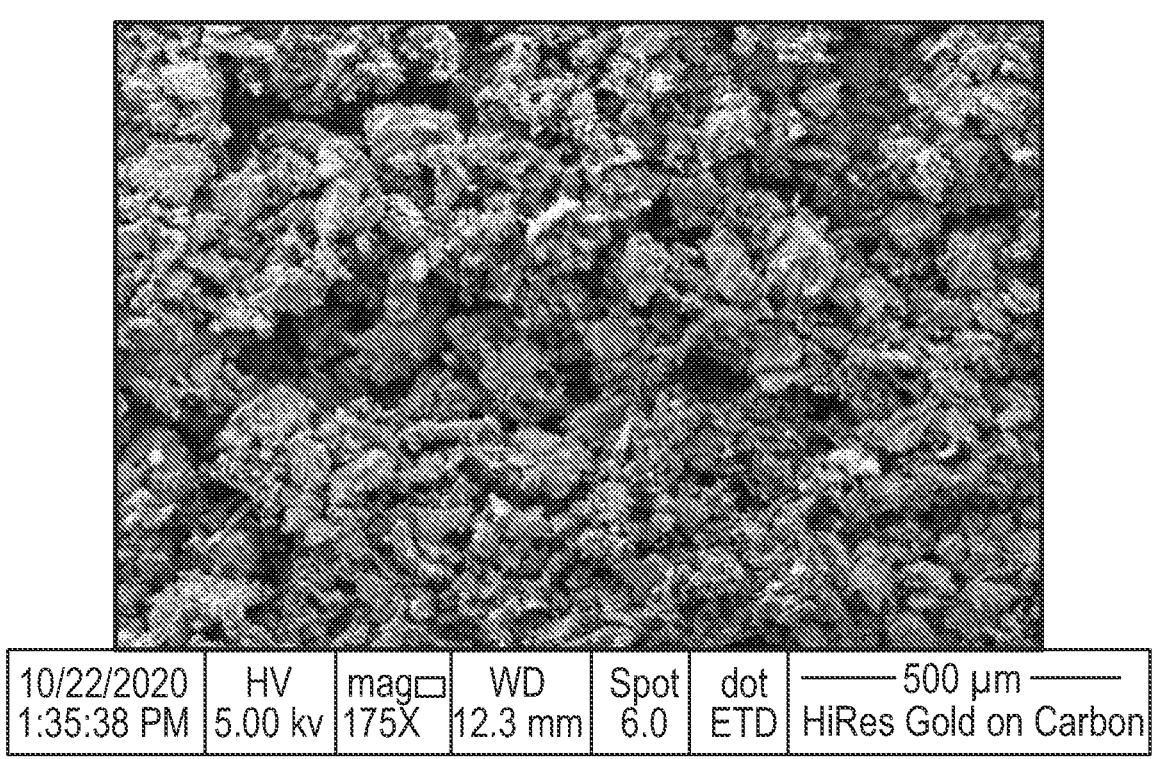
FIG. 6A is an SEM image of an aluminum-modified activated carbon (EXAMPLE 2) in accordance with one or more embodiments.
Figure 6B:
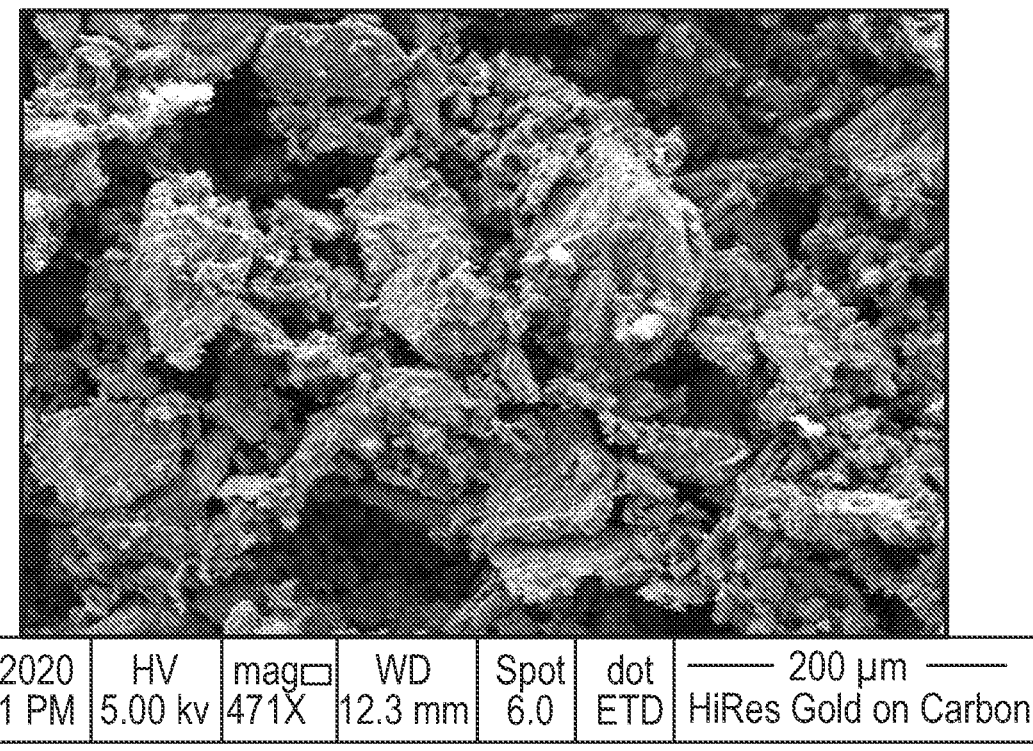
FIG. 6B is another SEM image of an aluminum-modified activated carbon (EXAMPLE 2) in accordance with one or more embodiments.
Figure 7A:
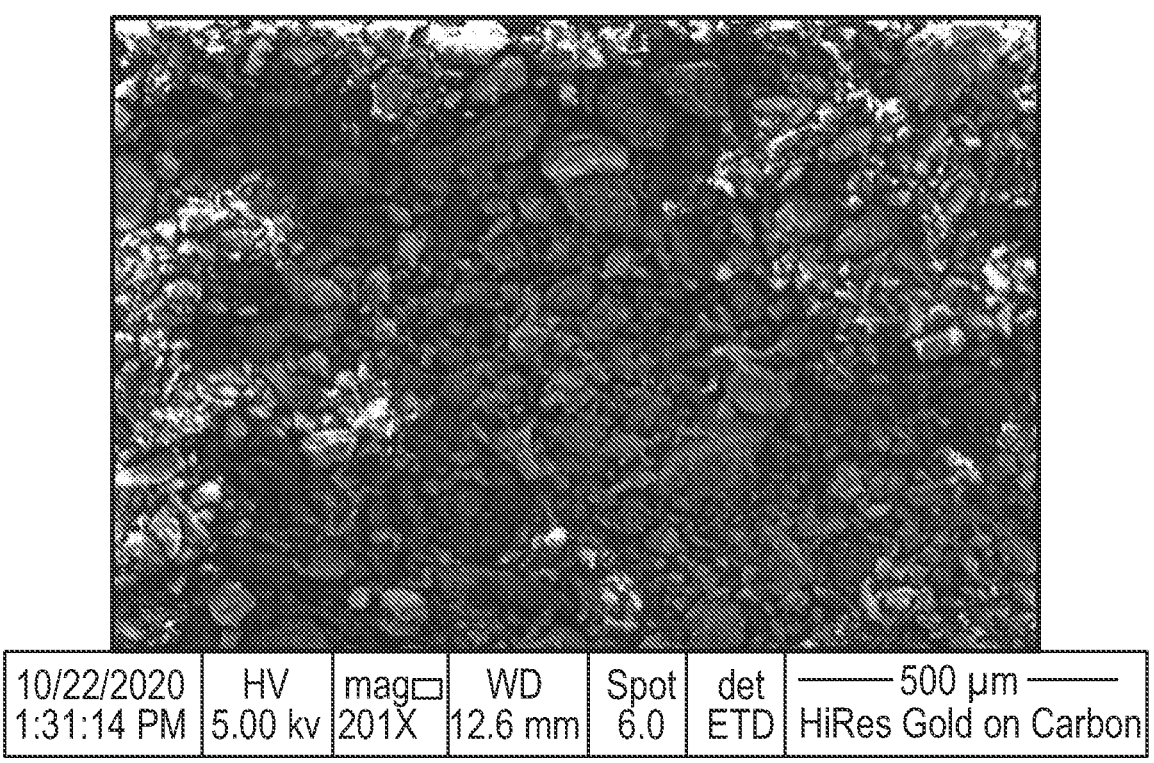
FIG. 7A is an SEM image of an iron-modified activated carbon (EXAMPLE 3) in accordance with one or more embodiments.
Figure 7B:
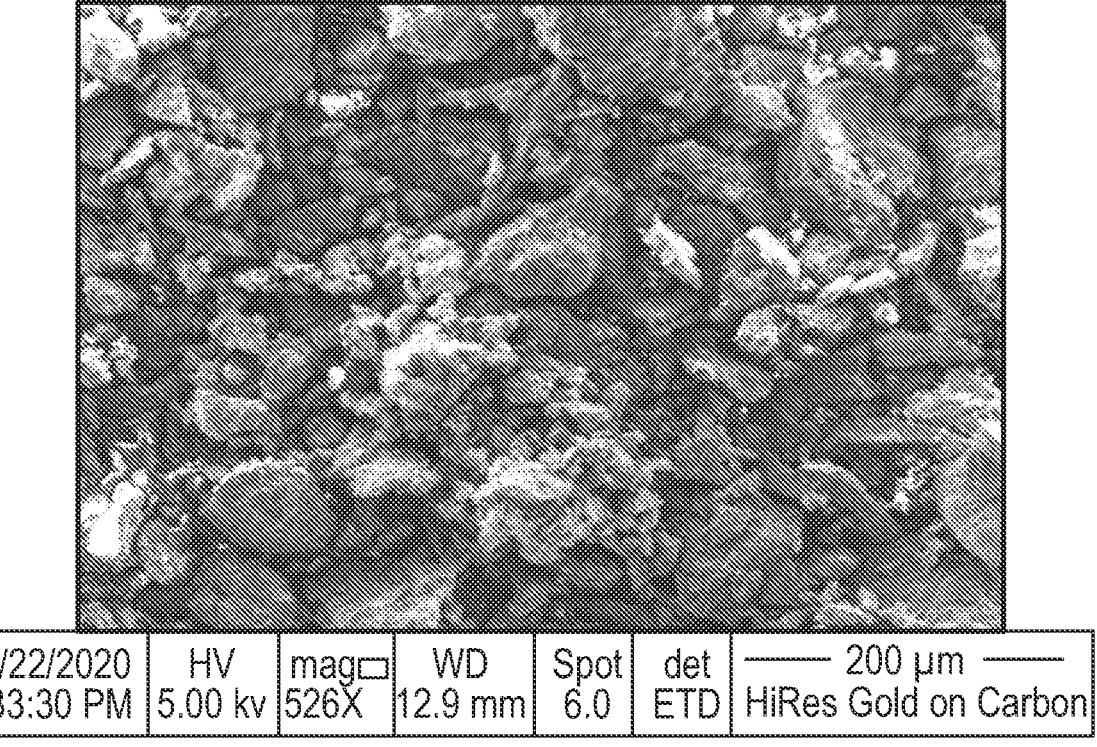
FIG. 7B is another SEM image of an iron-modified activated carbon (EXAMPLE 3) in accordance with one or more embodiments.

The surface areas of the activated carbon, the $SO_3$-AC of EXAMPLE 1, the Al—$SO_3$-AC of EXAMPLE 2, and the Fe—$SO_3$-AC of EXAMPLE 3 were measured by Brunauer-Emmett-Teller (BET) surface area analysis. In BET surface area analysis, the surface area of a material is estimated by introducing nitrogen gas into the material and measuring the amount of adsorbed nitrogen. The BET surface area analysis was conducted at different nitrogen gas pressures at a temperature of 77K. The surface areas of the samples obtained from the analysis are shown in Table 2. FIG. 3 is a plot of the volume of nitrogen adsorbed by each sample in cubic meters (m 3) with respect to relative pressures of the nitrogen gas. A relative pressure refers to a value represented by a ratio of a pressure in question divided by the standard atmospheric pressure. The results show that the activated carbon had a high surface area of approximately 3000 $m^2$/g and a decrease in the surface area was detected after the addition of sulfonate groups, as represented by the obtained surface area of the $SO_3$-AC of EXAMPLE 1, addition of aluminum, as represented by the obtained surface area of the Al—$SO_3$-AC of EXAMPLE 2, and addition of iron, as represented by the obtained surface area of the Fe—$SO_3$-AC of EXAMPLE 3. The reduction of the surface area in the $SO_3$-AC of EXAMPLE 1, the Al—$SO_3$-AC of EXAMPLE 2, and the Fe—$SO_3$-AC of EXAMPLE 3 is expected because additional chemical groups are introduced to the surface of the activated carbon. The substantial decrease seen in the Al—$SO_3$-AC of EXAMPLE 2 and the Fe—$SO_3$-AC of EXAMPLE 3 may be attributed to the large size of the metal and iron atoms which occupy a substantial surface area of the surface-modified activated carbon.

TABLE 2

| Material | Surface Area ($m^2$/g) |
|---|---|
| Activated Carbon (AC) | 2947 |
| EXAMPLE 1 (AC—$SO_3$) | 2600 |
| EXAMPLE 2 (AC—$SO_3$—Al) | 1817 |
| EXAMPLE 3 (AC—$SO_3$—Fe) | 1530 |

The surface topography of the activated carbon, the $SO_3$-AC of EXAMPLE 1, the Al—$SO_3$-AC of EXAMPLE 2, and the Fe—$SO_3$-AC of EXAMPLE 3 was analyzed with a scanning electron microscope. FIGS. 4A-4B, 5A-5B, 6A-6B and 7A-7B illustrate the surface topography of the activated carbon, the $SO_3$-AC of EXAMPLE 1, the Al—$SO_3$-AC of EXAMPLE 2, and the Fe—$SO_3$-AC of EXAMPLE 3, respectively. The randomness in the topography of the activated carbon may be related to the high surface area which is a desirable characteristic for the surface-modified activated carbon.

Figure 8:
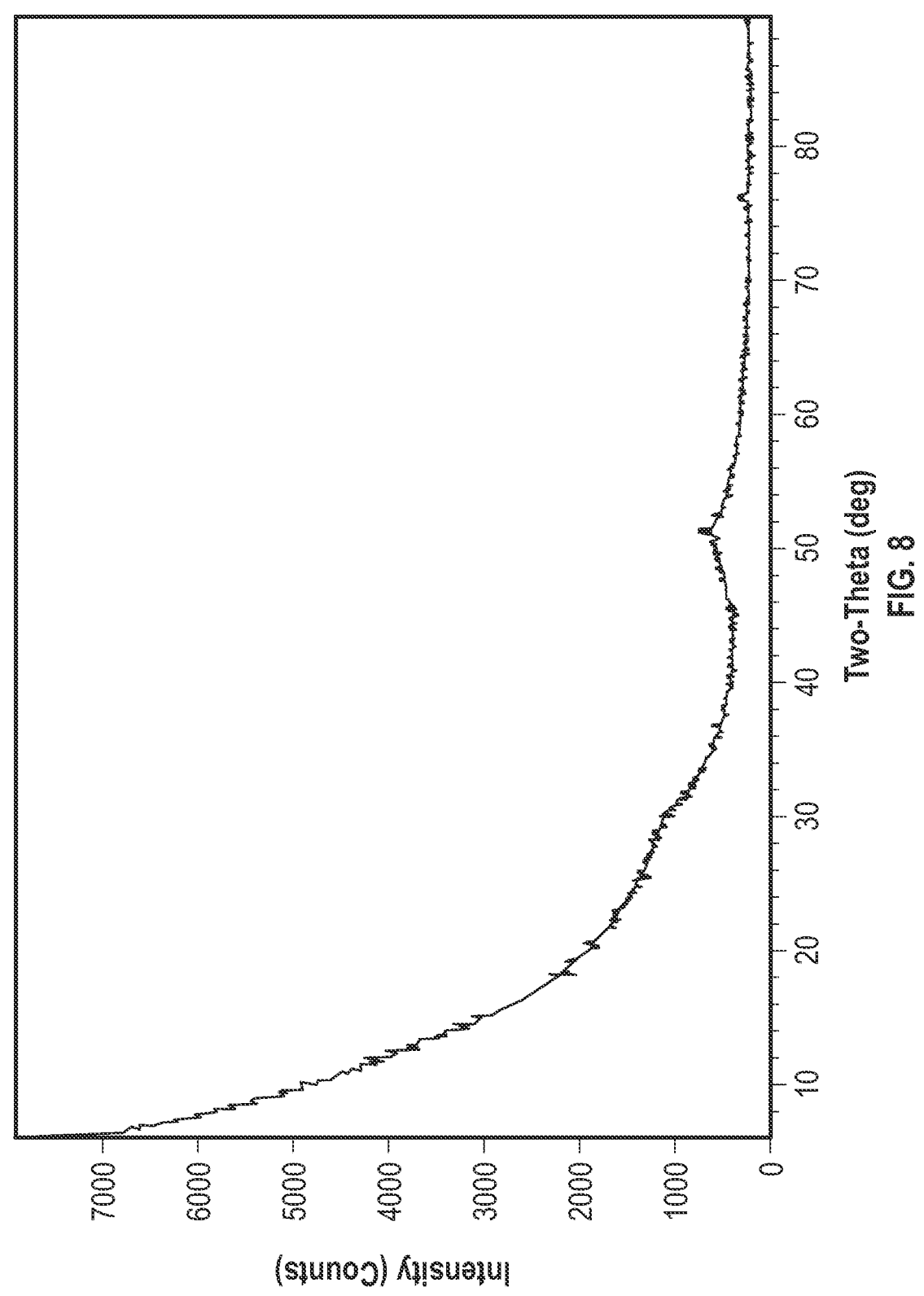
FIG. 8 is an X-ray diffraction (XRD) graph of activated carbon in accordance with one or more embodiments.
Figure 9:
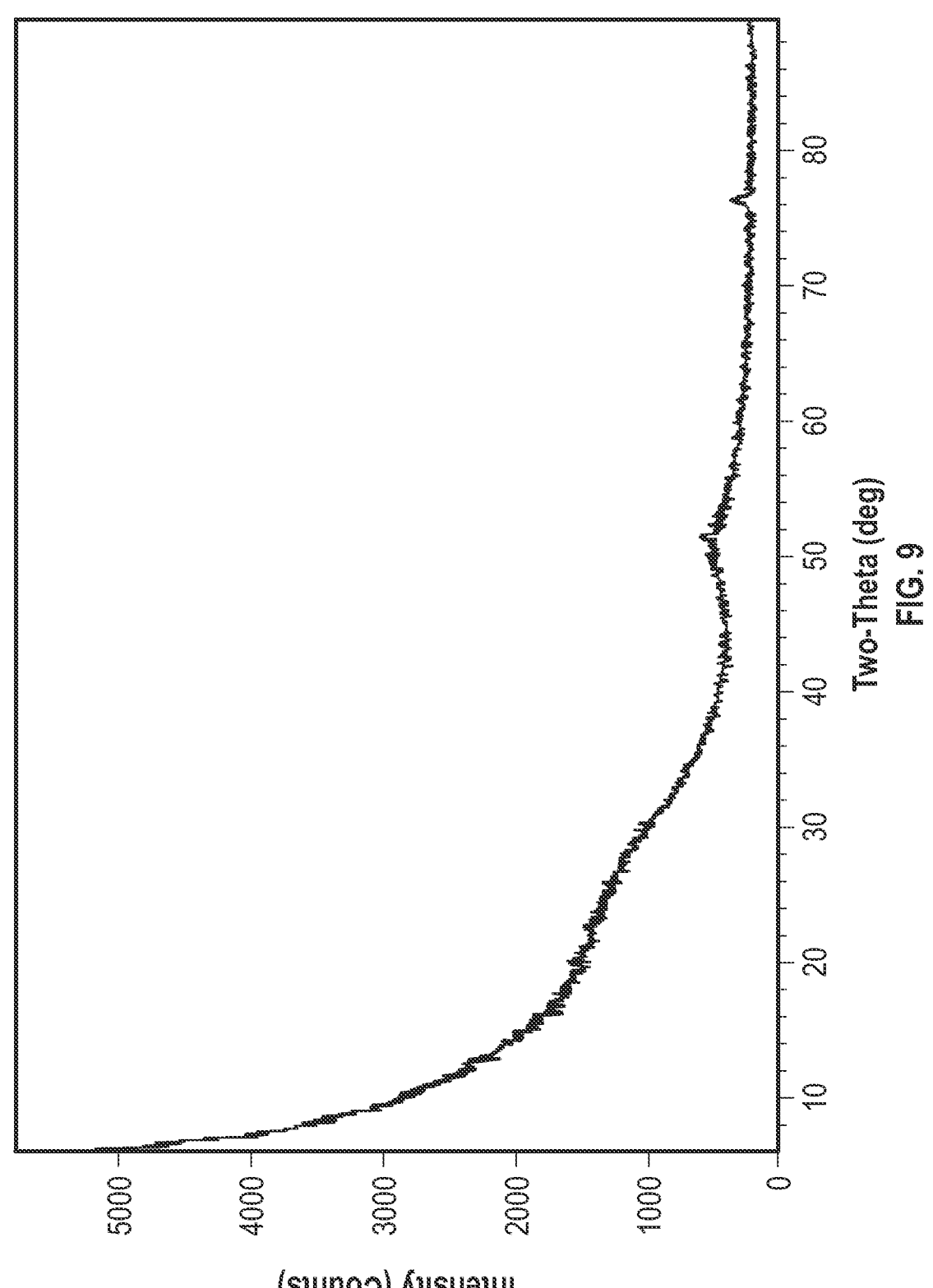
FIG. 9 is an XRD graph of a sulfonated activated carbon (EXAMPLE 1) in accordance with one or more embodiments.
Figure 10:
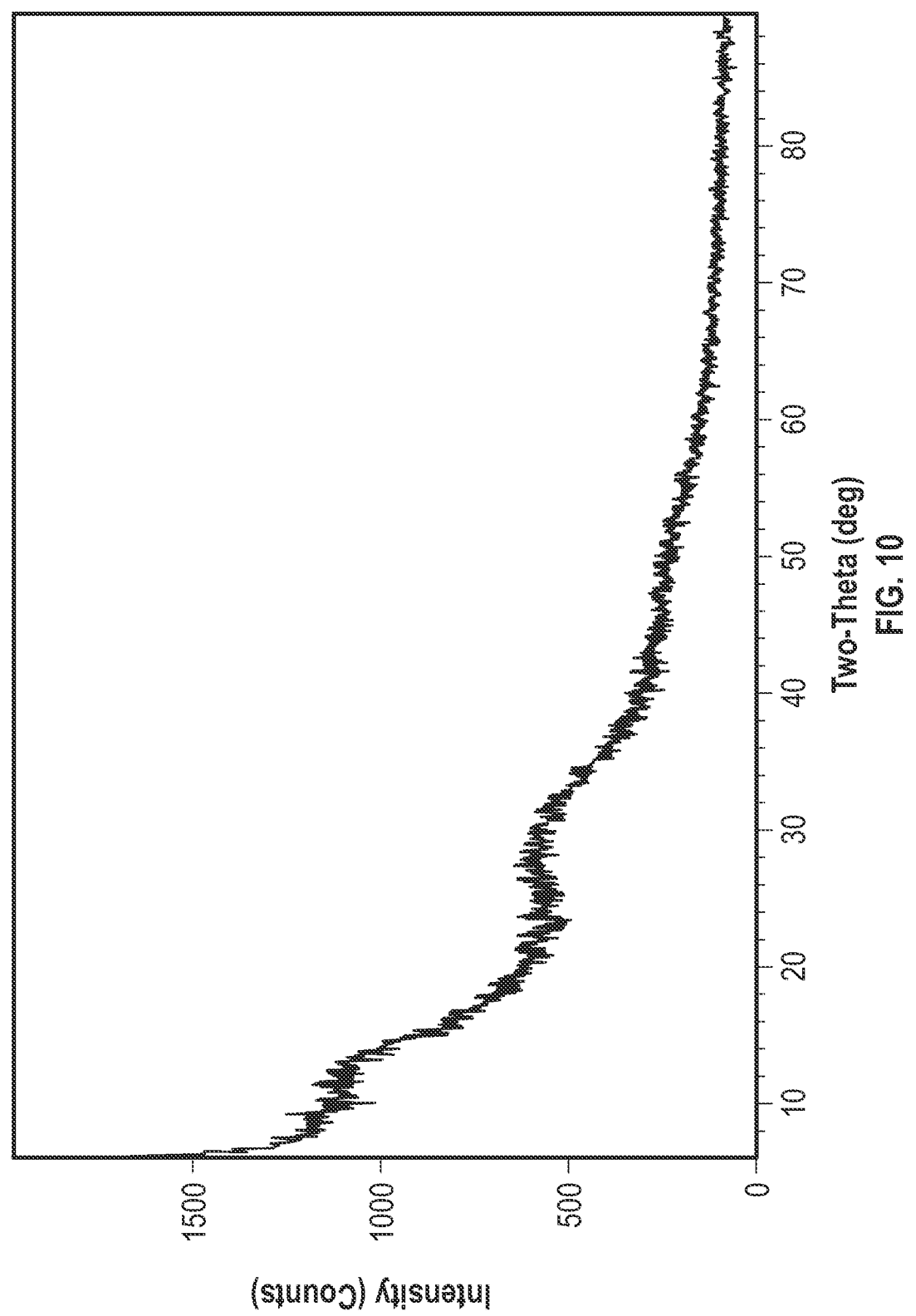
FIG. 10 is an XRD graph of an aluminum-modified activated carbon (EXAMPLE 2) in accordance with one or more embodiments.
Figure 11:
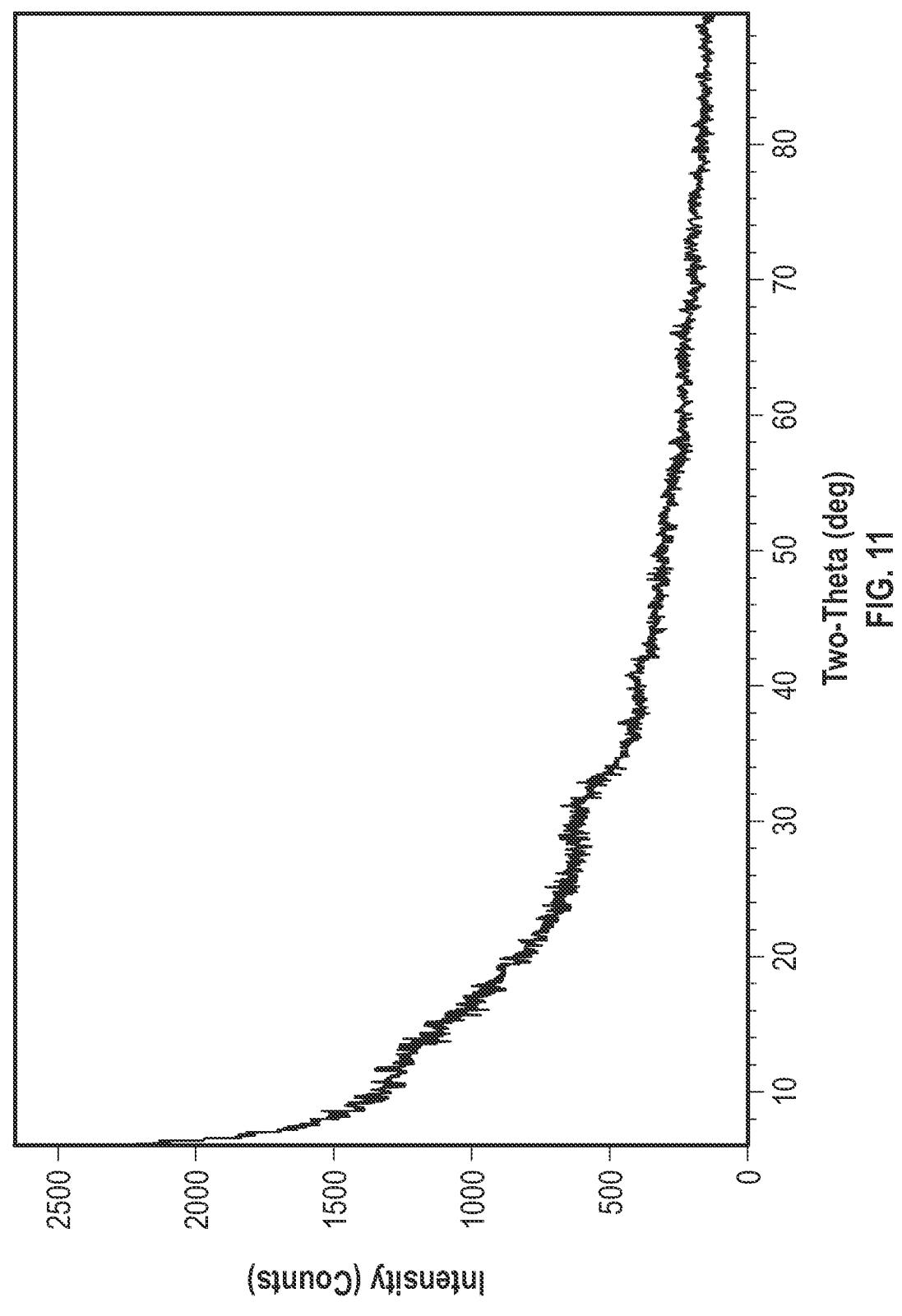
FIG. 11 is an XRD graph of an iron-modified activated carbon (EXAMPLE 3) in accordance with one or more embodiments.

The activated carbon, and the $SO_3$-AC of EXAMPLE 1, the Al—$SO_3$-AC of EXAMPLE 2, and the Fe—$SO_3$-AC of EXAMPLE 3 were also analyzed using X-ray diffraction (XRD). In general, XRD is used for phase identification of a crystalline material and it is difficult to properly analyze amorphous materials, such as activated carbon, because the results show "humps" instead of well-defined peaks. However, detection of certain elements in amorphous material is still possible with XRD analysis. FIGS. 8-11 are XRD spectra of the activated carbon, the $SO_3$-AC of EXAMPLE 1, the Al—$SO_3$-AC of EXAMPLE 2, and the Fe—$SO_3$-AC of EXAMPLE 3, respectively. FIG. 8 shows a hump around the two-theta value of 50 degrees which is also seen in FIGS. 9-11. In FIG. 9, the hump at 25 degrees was intensified vertically and horizontally, which may be due to an overlap with the added sulfonic acid group on the surface of the activated carbon. FIG. shows a raise, or a hump, at the lower portion of approximately 12.5 degrees which indicates the modification of the activated carbon with aluminum. FIG. 11 shows a raise, or a hump, approximately at 15 degrees which indicates the modification of the activated carbon with iron.

Phenol Adsorption Characterization

A study of phenol adsorption properties of each adsorbent (the activated carbon, the $SO_3$-AC of EXAMPLE 1, the Al—$SO_3$-AC of EXAMPLE 2, and the Fe—$SO_3$-AC of EXAMPLE 3) was conducted by weighing 1, 2, 3, 4, and 5 mg of each adsorbent, and dispersing the adsorbent in separate 200 mL beakers containing 50 mL aqueous phenol solution of various initial concentrations (1000, 2000, 3000, 4000 and 5000 ppm) at room temperature. A sample of the solution was collected from each beaker after 1, 5, 15, 30 and 60 minutes using a syringe and a syringe filter to ensure that the sample only contains the solution.

Each sample was analyzed to obtain experimental adsorption capacity at equilibrium ($q_e$), the adsorption capacity at time t ($q_t$), and the concentration of the adsorbate, or phenol, at equilibrium ($C_e$), using Agilent 1260 High Pressure Liquid Chromatography (HPLC) system with a binary pump, a degasser and an auto sampler. The Diode Array Detector (DAD) was set to record UV spectra from 200 nm to 400 nm. Instrument control, data recording and data analysis were performed using OpenLab software available from Agilent Technologies. Sample separation was performed using Eclipse XDB-C18 column (150×4.6 mm) available from Agilent Technologies. The average particle size of the silica for the analysis was 5 μm. A 50/50 mixture by volume of methanol and 0.1% formic acid in water was used as the mobile phase. The detector was set at 275 nm to monitor the elution of phenol from the column.

Adsorption Isotherm and Kinetics Models

Adsorption isotherm, or the relationship between the adsorbate in the liquid and the adsorbate adsorbed by the adsorbent, of the activated carbon, the $SO_3$-AC of EXAMPLE 1, Al—$SO_3$-AC of EXAMPLE 2, and the Fe—$SO_3$-AC of EXAMPLE 3 with phenol was studied by comparing the experimental data of phenol adsorption by the activated carbon, the $SO_3$-AC of EXAMPLE 1, the Al—$SO_3$-AC of EXAMPLE 2, and the Fe—$SO_3$-AC of EXAMPLE 3 with various models.

Langmuir is a two-parameter model suggesting a monolayer adsorption on the surface of the material. The favorability of Langmuir adsorption is determined by the separation factor $R_L$. Equations (1) and (2) may be used to calculate the parameters for this model:

$$R_L = \frac{1}{1 + K_L C_O} \tag{1}$$

$$\frac{C_e}{q_e} = \frac{1}{q_e K_e} + \frac{C_e}{q_m} \tag{2}$$

Freundlich isotherm is a model which describes the adsorption on a heterogeneous surface and defines the exponential distribution of active sites. Freundlich's formula is described in Equation (3). $K_F$ is Freundlich isotherm constant, 1/n is the adsorption intensity which also indicates the relative distribution of the energy and the heterogeneity of the adsorbent sites. The Freundlich maximum adsorption capacity can be calculated by Equation 4.

$$\log q_e = \log K_{F+} \frac{1}{n} \log C_e \tag{3}$$

$$K_F = \frac{q_m}{C_O^{1/n}} \tag{4}$$

Temkin isotherm is a unique model which considers the adsorbate-adsorbent interactions on the adsorption process. This model assumes that the heat of adsorption ($\Delta H_{ADSORPTION}$) decreases linearly as the adsorbent's surface coverage increases. Equation (5) describes Temkin's model isotherm. $K_T$ is Temkin's isotherm constant, R is the universal gas law, b is a parameter related to the heat of sorption, and T is the temperature.

$$q_e = \frac{RT}{b} \ln K_T + \frac{RT}{b} \ln C_e \tag{5}$$

Jovanovic isotherm equation shown in Equation (6) may provide similar adsorption behavior prediction as Langmuir:

$$\ln q_e = \ln q_{max} - K_j C_e \tag{6}$$

Jovanovic isotherm equation provides additional consideration regarding a mechanical interaction between the adsorbate and the adsorbent.

The kinetics of phenol adsorption by the activated carbon, the $SO_3$-AC of EXAMPLE 1, the Al—$SO_3$-AC of EXAMPLE 2, and the Fe—$SO_3$-AC of EXAMPLE 3 were studied by comparing the experimental data of phenol adsorption by the activated carbon, the $SO_3$-AC of EXAMPLE 1, the Al—$SO_3$-AC of EXAMPLE 2, and the Fe—$SO_3$-AC of EXAMPLE 3 with various models.

Pseudo-First Order (PFO), also known as Lagergren's rate equation, is a kinetic model which represents a type of adsorption mechanism which is a bi-molecular reaction made to be uni-molecular by increasing the concentration of one of the substrates. The adsorption is dependent on the concentration of adsorbate (which is phenol in this study) because the binding sites on the adsorbent are assumed to be many and therefore expressed as excess of the second substrate (which is the adsorbent). The equation of PFO is shown as Equation (7). $q_e$ is the experimental adsorption capacity at equilibrium, $q_t$ is the adsorption capacity at time t, and K is the rate of adsorption. In this model, $q_e$ should be similar to $Q_{THEORETICAL}$ given from the best fitted isotherm model.

$$\ln(q_e - q_t) = \ln q_e - K_1 t \tag{7}$$

Pseudo-Second Order (PSO) is a kinetic model which the adsorption rate is described as a proportional parameter to the binding sites on the surface of the adsorbent. Therefore, PSO is dependent on the concentration of the adsorbate in the surface of the adsorbent, and the adsorption driving force described as $Q_{EQUILIBRIUM} - Q_{TIME}$ is an indicative of the surface coverage of the adsorbent. PSO is shown in Equation (8).

$$\frac{t}{q_t} = \frac{1}{K q_e^2} + \frac{t}{Q_e} \tag{8}$$

Elovic kinetics model shown in Equation (9) generally describes the kinetics of chemisorption of gas onto solids.

$$q_t = \frac{1}{\beta} \ln(\alpha\beta) + \frac{1}{\beta} \ln(t) \tag{9}$$

The Elovic model may also be applicable to the adsorption kinetic behavior of ions/molecules onto solids, such as adsorption of phenol onto iron-modified sulfonated activated carbon.

Comparison of Experimental Adsorption Isotherm/Kinetics with Models

Figure 12:
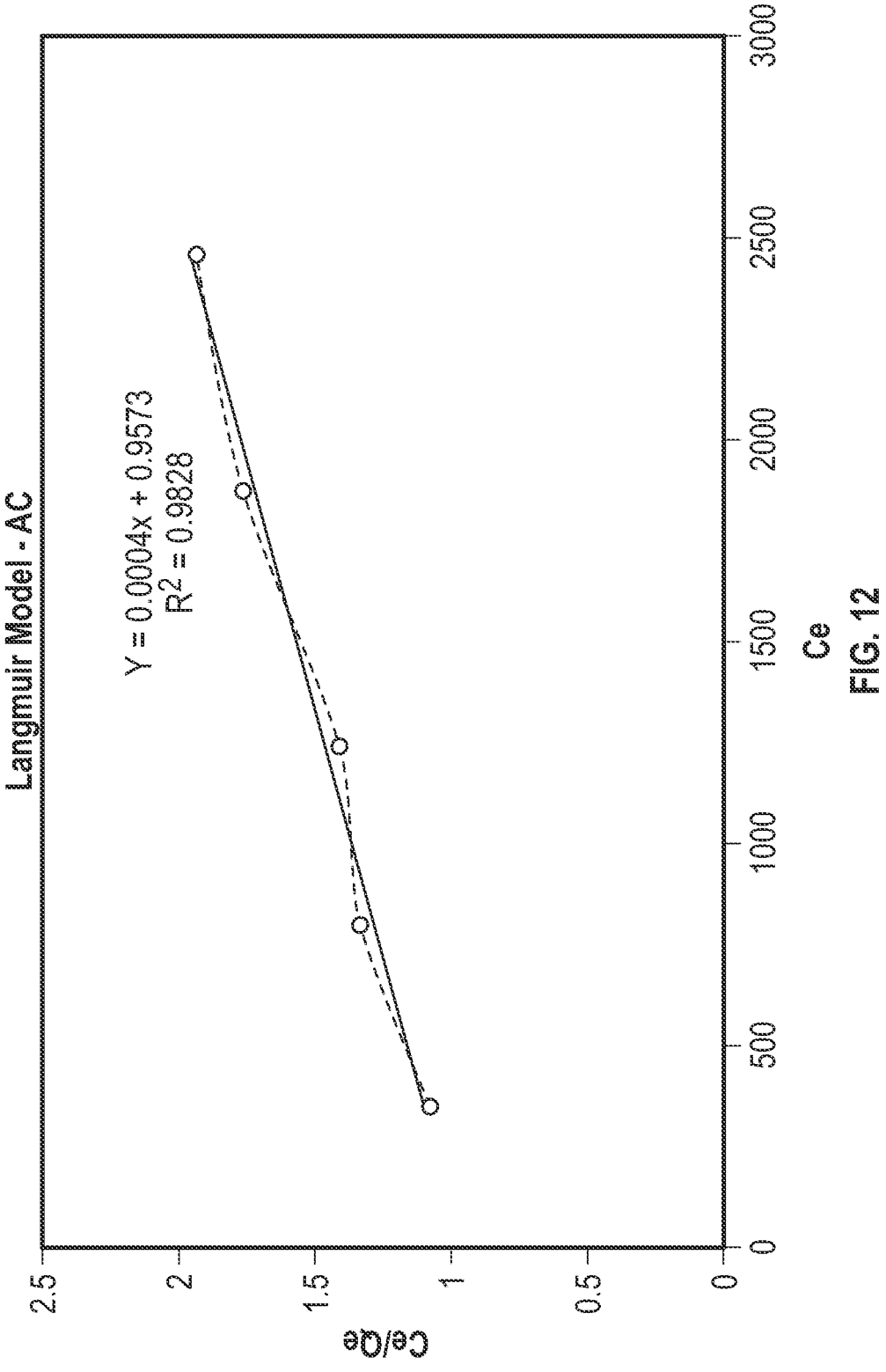
FIG. 12 is a plot of Ce/Qe of a phenol solution containing activated carbon with respect to Ce, and a best-fit line in accordance with one or more embodiments.

The adsorption isotherm of the activated carbon shows good correlation coefficient with Langmuir adsorption model. FIG. 12 is a plot of Ce/Qe with respect to Ce obtained from the samples of phenol solutions containing activated carbon, and a best-fit line based on Langmuir model. Equations (1) and (2) were used to calculate Langmuir maximum adsorption capacity, $Q_m$, which is 2500 mg/g, and the separation factor, $R_L$, which is 0.54. The Langmuir parameters for the adsorption of phenol on activated carbon is summarized in Table 3. $R_L$ of 0.54 indicates a favorable adsorption.

TABLE 3

| $Q_m$ (mg/g) | 2500 |
| --- | --- |
| $K_L$ (L/mg) | 0.00042 |
| $R_L$ | 0.54 |
| $R^2$ | 0.9828 |

Figure 13:
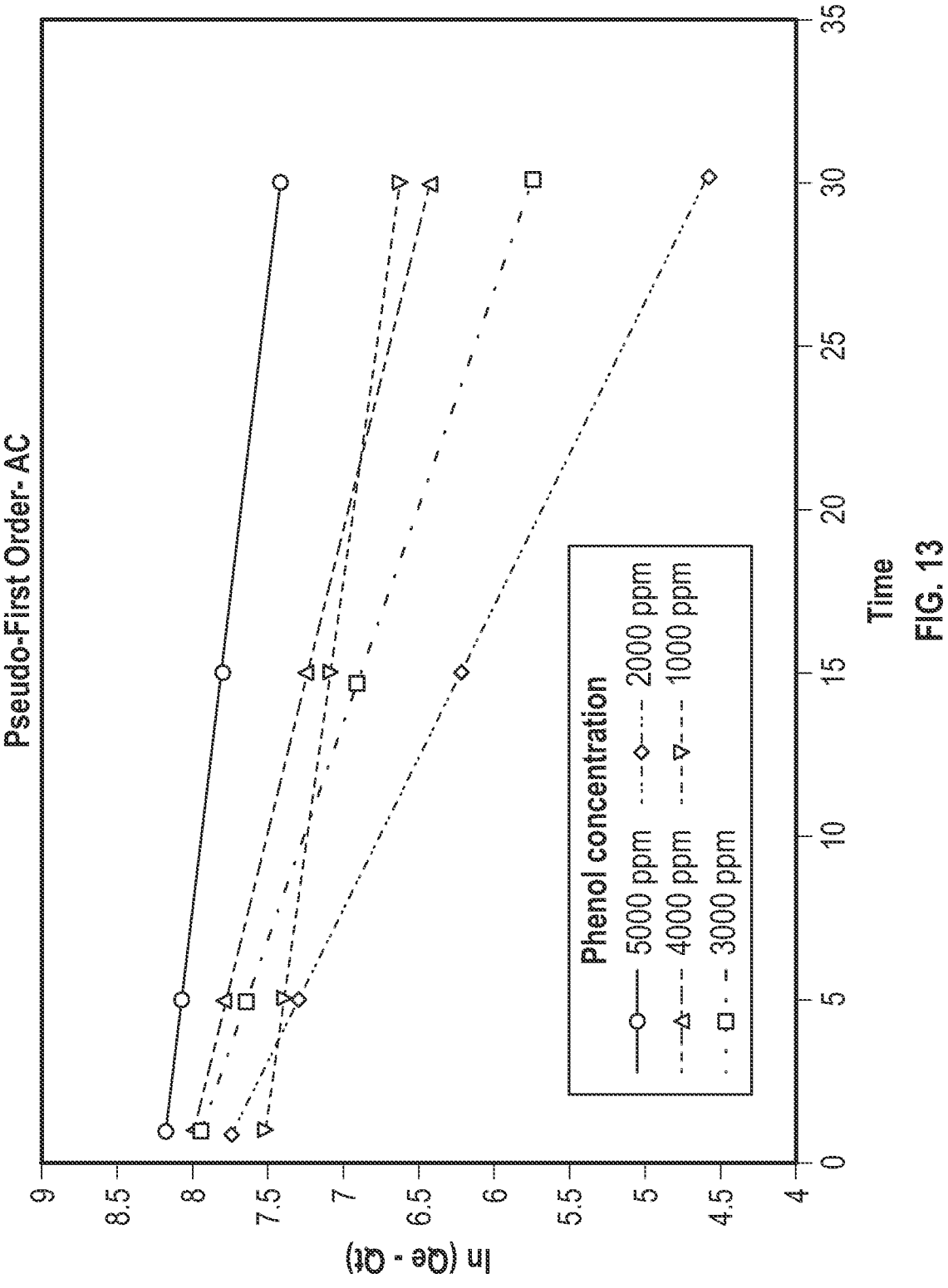
FIG. 13 is a plot of $\ln(Qe-Qt)$ of a phenol solution containing activated carbon with respect to time, and a best-fit line, based on different initial phenol concentrations in accordance with one or more embodiments.

The kinetics of phenol adsorption by activated carbon was best fitted in Lagergren's Pseudo-First Order model which as shown in Equation (7). FIG. 13 is a plot of $\ln(Q_e - Q_t)$ with respect to time obtained from the samples of phenol solutions containing activated carbon (with the initial phenol concentrations of 1000, 2000, 3000, 4000 and 5000 ppm), and a best-fit line based on Lagergren's model shown at different initial phenol concentrations. The Lagergren's parameters obtained from the experimental results are provided in Table 4. The theoretical adsorption capacity of Lagergren's model was found to be increasing with respect to the concentration of phenol. However, the average was found to be 2845 mg/g which is similar to the adsorption capacity in Langmuir's model.

TABLE 4

| Initial phenol concentration (ppm) | $K_{PFO}$ (mg/g*min) | $Q_E$ (mg/g) | $R^2$ |
|---|---|---|---|
| 1000 | 0.0308 | 1892 | 0.9994 |
| 2000 | 0.1077 | 2524 | 0.9999 |
| 3000 | 0.0756 | 3030 | 0.9915 |
| 4000 | 0.0541 | 3129 | 0.9930 |
| 5000 | 0.026 | 3650 | 0.9957 |

Figure 14:
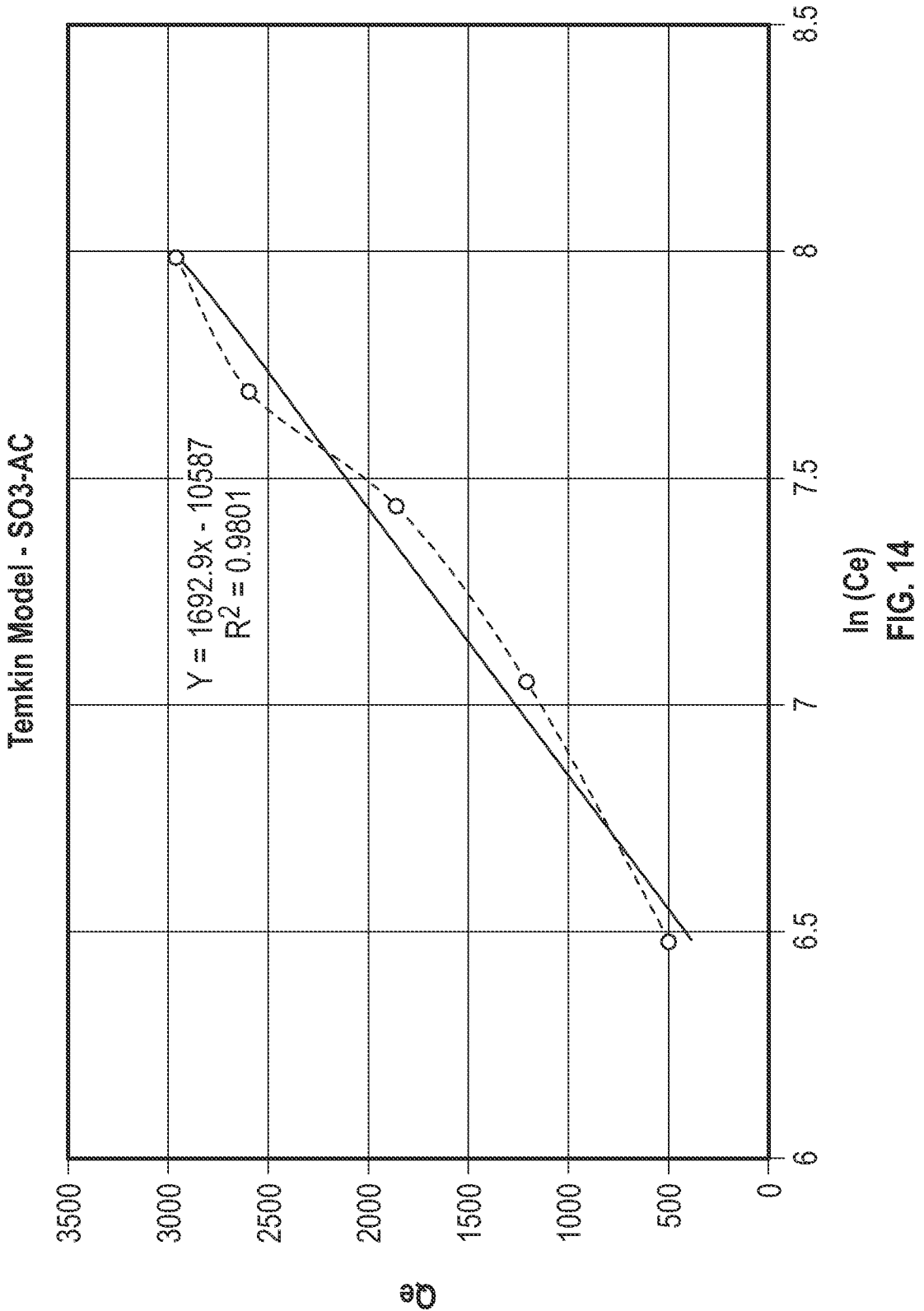
FIG. 14 is a plot of Qe of a phenol solution containing a sulfonated activated carbon (EXAMPLE 1) with respect to ln(Ce), and a best-fit line in accordance with one or more embodiments.

The experimental adsorption isotherm of the $SO_3$-AC of EXAMPLE 1 shows the highest correlation coefficient with Temkin adsorption model as shown in FIG. 14. Equation (5) was used to calculate Temkin's isotherm constant $K_T$ and b which is related to the heat of adsorption. All Temkin's isotherm parameters are provided in Table 5.

TABLE 5

| $K_T$ (L/mol) | b (J/mol) | $R^2$ |
|---|---|---|
| 0.0019 | 1.4635 | 0.9801 |

Figure 15:
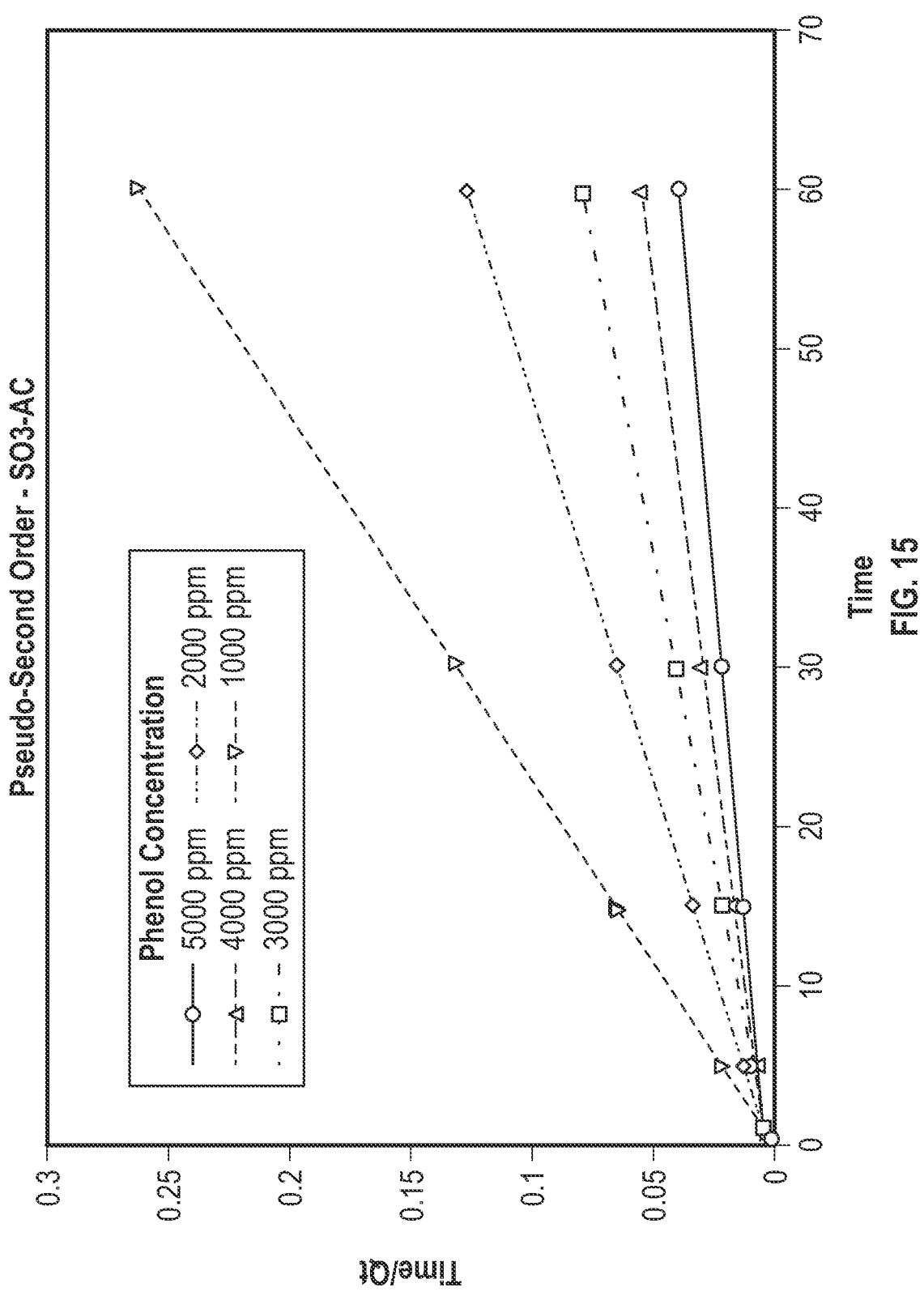
FIG. 15 is a plot of Time/Qt of a phenol solution containing the sulfonated activated carbon (EXAMPLE 1) with respect to time, and a best-fit line, based on different initial phenol concentrations in accordance with one or more embodiments.

The experimental results of the kinetics of phenol adsorption by the $SO_3$-AC of EXAMPLE 1 were best fitted on Pseudo-Second Order model which is shown in Equation (8). FIG. 15 is a plot of time/Qt with respect to time obtained from the samples of phenol solutions containing the $SO_3$-AC of EXAMPLE 1 (with the initial phenol concentrations of 1000, 2000, 3000, 4000 and 5000 ppm) and a best-fit line based on Pseudo-Second Order (PSO) model at different phenol concentrations. The kinetic parameters were obtained and calculated based on the experimental results, which are provided in Table 6. The theoretical adsorption capacity of Pseudo-Second Order model was found to be increasing with respect to the concentration of Phenol, however the average was found to be 850 mg/g.

TABLE 6

| Initial phenol concentration (ppm) | $Q_E$ (mg/g) | $K_{PSO}$ (g/mg*min) | $R^2$ |
|---|---|---|---|
| 1000 | 227 | $9.68 \times 10^{-2}$ | 0.9992 |
| 2000 | 476 | $1.76 \times 10^{-3}$ | 0.9979 |
| 3000 | 833 | $4.80 \times 10^{-4}$ | 0.9944 |
| 4000 | 1250 | $7.11 \times 10^{-4}$ | 0.9995 |
| 5000 | 1666 | $6.43 \times 10^{-5}$ | 0.9899 |

Figure 16:
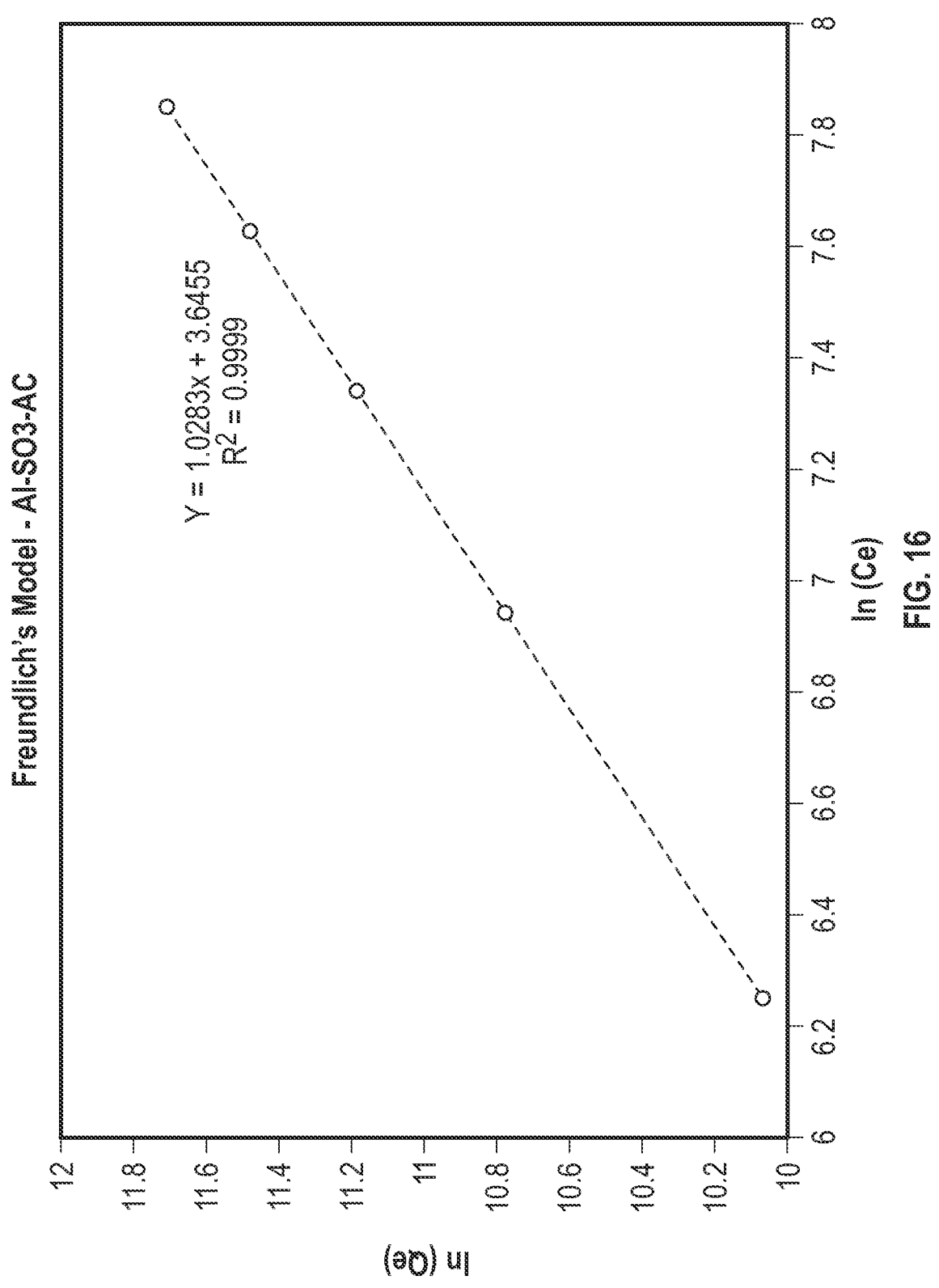
FIG. 16 is a plot of ln(Qe) of a phenol solution containing the aluminum-modified activated carbon (EXAMPLE 2) with respect to ln(Ce), and a best-fit line in accordance with one or more embodiments.

The experimental adsorption isotherm of the Al—$SO_3$-AC of EXAMPLE 2 shows exceptional correlation coefficient with Freundlich's adsorption model as shown in FIG. 16. Both Equations (3) and (4) were used to calculate Freundlich's maximum adsorption capacity $Q_m$ which was found to be 2593 mg/g and Freundlich's adsorption intensity 1/n and adsorption constant $K_F$. Freundlich's isotherm parameters obtained from the experimental adsorption isotherm of the Al—$SO_3$-AC of EXAMPLE 2 are shown in Table 7.

TABLE 7

| | |
|---|---|
| $K_F$ (L/g) | 38.30 |
| n | 0.97 |
| $Q_M$ | 2593 |
| $R^2$ | 0.9999 |

Figure 17:
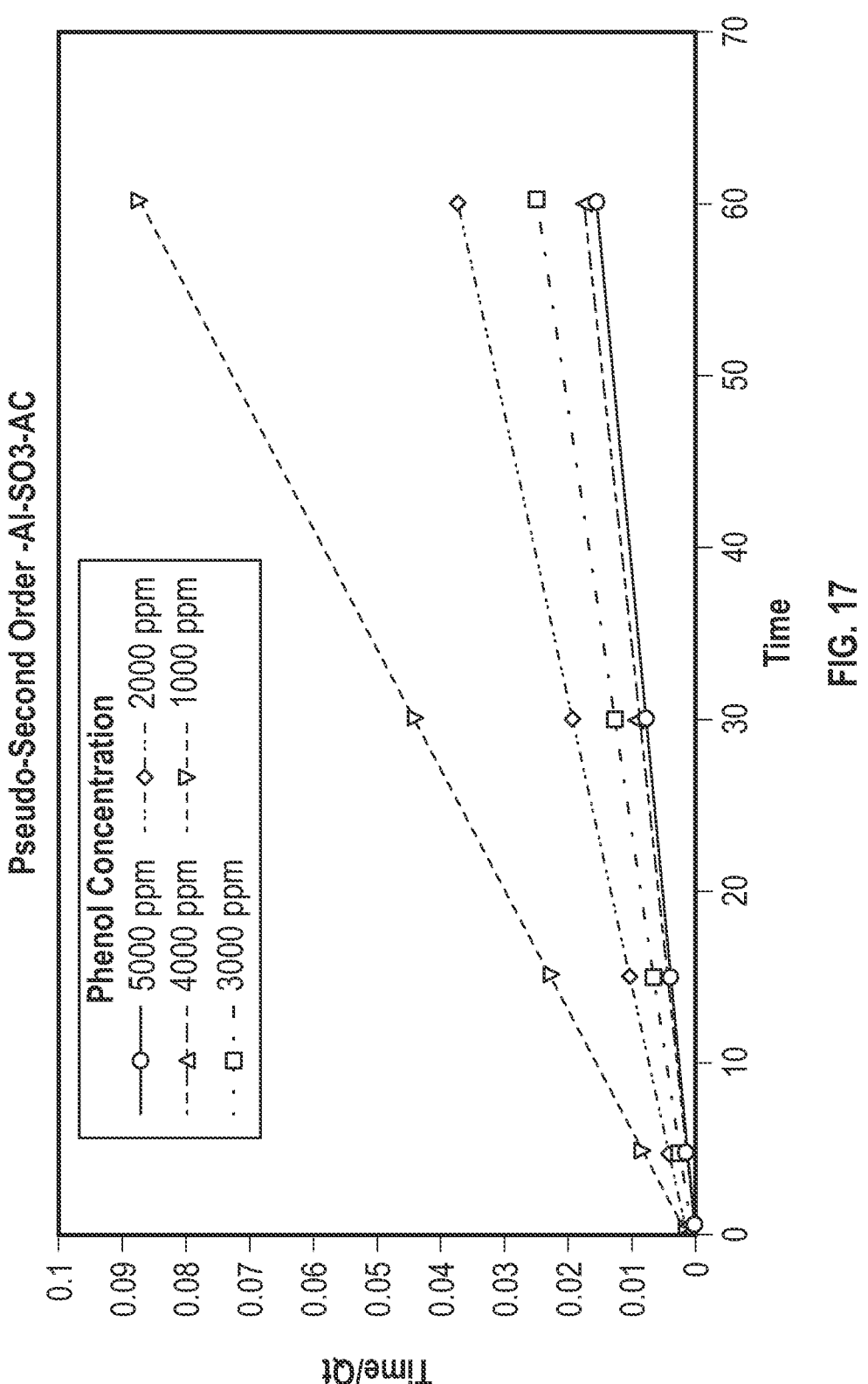
FIG. 17 is a plot of Time/Qt of a phenol solution containing the aluminum-modified activated carbon (EXAMPLE 2) with respect to time, and a best-fit line, based on different initial phenol concentrations in accordance with one or more embodiments.

FIG. 17 is time/Qt plot with respect to time obtained from the samples of phenol solutions containing the Al—$SO_3$-AC of EXAMPLE 2 (with the initial phenol concentrations of 1000, 2000, 3000, 4000 and 5000 ppm), and a best-fit line based on PSO (Lagergren) model at different phenol concentrations. The Lagergren's parameters were calculated from the experimental results, which are provided in Table 8. The theoretical adsorption capacity of Lagergren's model was found to be increasing with respect to the concentration of phenol, however the average was found to be 2475.8 mg/g which is similar to the adsorption capacity in Langmuir's model.

TABLE 8

| Initial phenol concentration (ppm) | $Q_E$ (mg/g) | $K_{PSO}$ (g/mg*min) | $R^2$ |
|---|---|---|---|
| 1000 | 714 | $1.40 \times 10^{-3}$ | 0.9998 |
| 2000 | 1666 | $2.57 \times 10^{-4}$ | 0.9962 |
| 3000 | 2500 | $2.29 \times 10^{-4}$ | 0.9974 |
| 4000 | 3333 | $1.80 \times 10^{-4}$ | 0.9950 |
| 5000 | 4166 | $1.33 \times 10^{-4}$ | 0.9971 |

Figure 18:
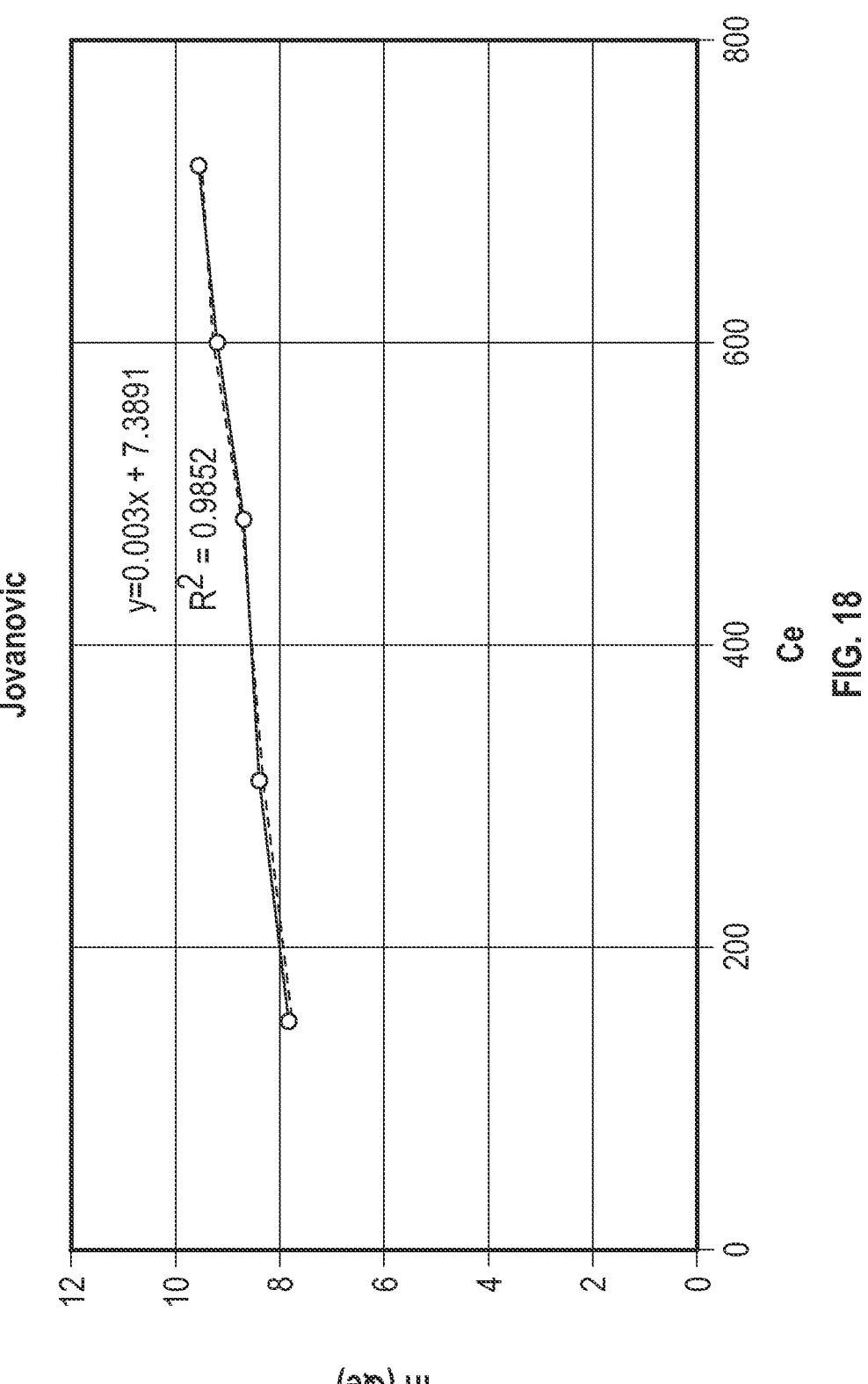
FIG. 18 is a plot of ln(Qe) of a phenol solution containing the iron-modified activated carbon (EXAMPLE 3) with respect to Ce, and a best-fit line in accordance with one or more embodiments.

The Experimental adsorption isotherm of the Fe—$SO_3$-AC of EXAMPLE 3 and a best-fit line based on Jovanovic model are shown in FIG. 18. Jovanovic isotherm equation parameters Qmax and $K_1$ were obtained from the adsorption isotherm results of the Fe—$SO_3$-AC of EXAMPLE 3. The obtained parameters are shown in Table 9.

TABLE 9

| Slope | Intercept | Qmax | $K_1$ |
|---|---|---|---|
| 0.0016 | 7.7453 | 2310.7 | −0.0016 |

Figure 19:
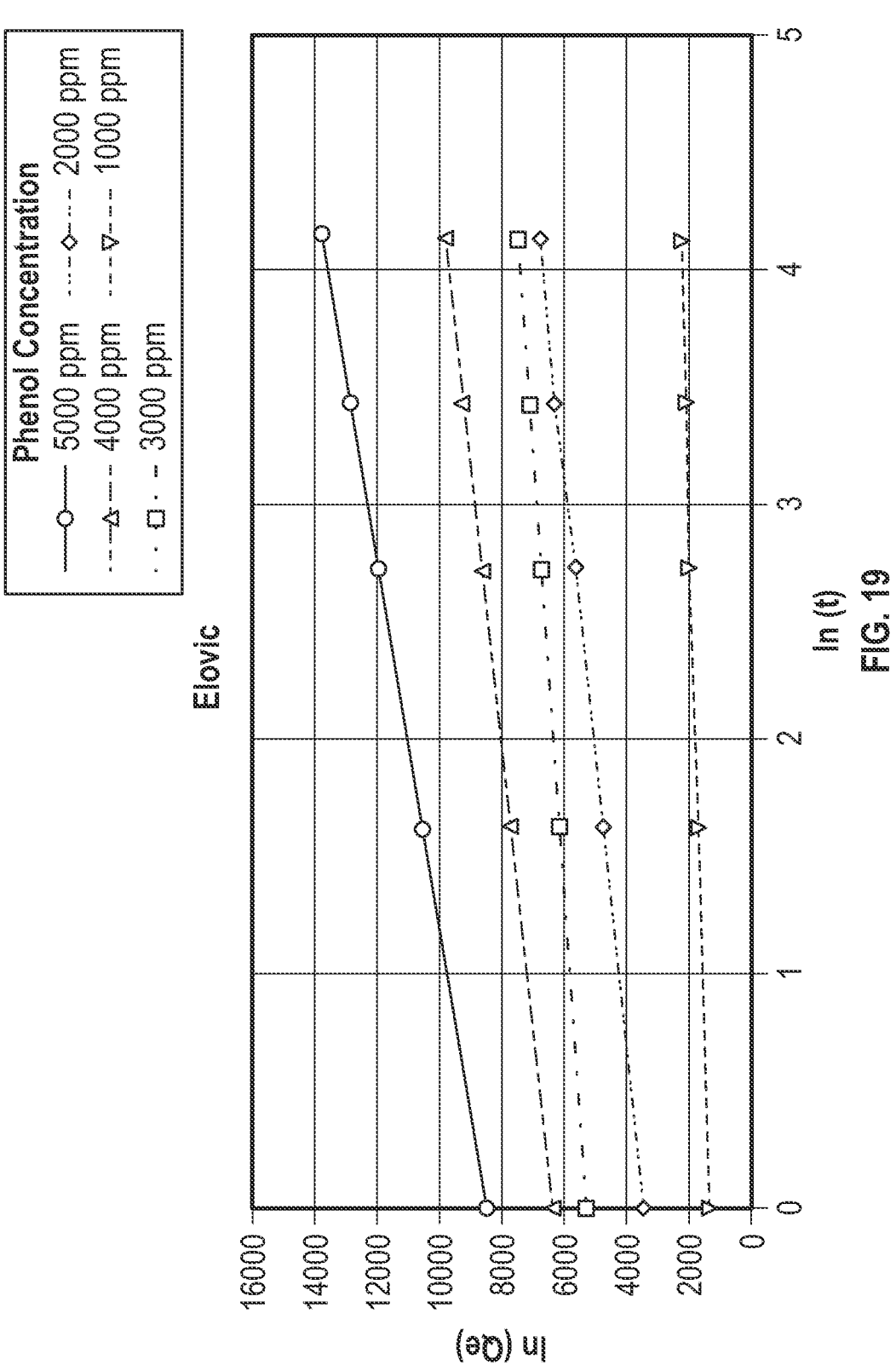
FIG. 19 is a plot of Q(t) of a phenol solution containing the iron-modified activated carbon (EXAMPLE 3) with respect to ln(t), and a best-fit line, based on different initial phenol concentrations in accordance with one or more embodiments.

The Experimental results of the kinetics of phenol adsorption of the Fe—$SO_3$-AC of EXAMPLE 3 and best-fit lines based on Elovic model are shown in FIG. 19. FIG. 19 is a ln(Qe) plot with respect to ln(t) obtained from the samples of phenol solutions containing the Fe—$SO_3$-AC of EXAMPLE 3 (with the initial phenol concentrations of 1000, 2000, 3000, 4000 and 5000 ppm), and a best-fit line based on Elovic model at different phenol concentrations. Elovic parameters $\alpha$ and $\beta$ were calculated from the experimental kinetic adsorption data of the Fe—$SO_3$-AC of EXAMPLE 3. The parameters are shown in Table 10.

TABLE 10

| Trial | Initial phenol concentration (ppm) | Slope | Intercept | $\beta$ | $\alpha$ | $R^2$ |
|---|---|---|---|---|---|---|
| 1 | 1000 | 204.34 | 1427.2 | 0.004894 | 2.21E+05 | 0.9885 |
| 2 | 2000 | 826.73 | 3416.8 | 0.001210 | 5.16E+04 | 0.9879 |
| 3 | 3000 | 561.43 | 5253.6 | 0.001781 | 6.50E+06 | 0.9858 |
| 4 | 4000 | 833.95 | 6429.7 | 0.001199 | 1.86E+06 | 0.9776 |
| 5 | 5000 | 1252 | 8592.1 | 0.000799 | 1.20E+06 | 0.9548 |

Figure 20:
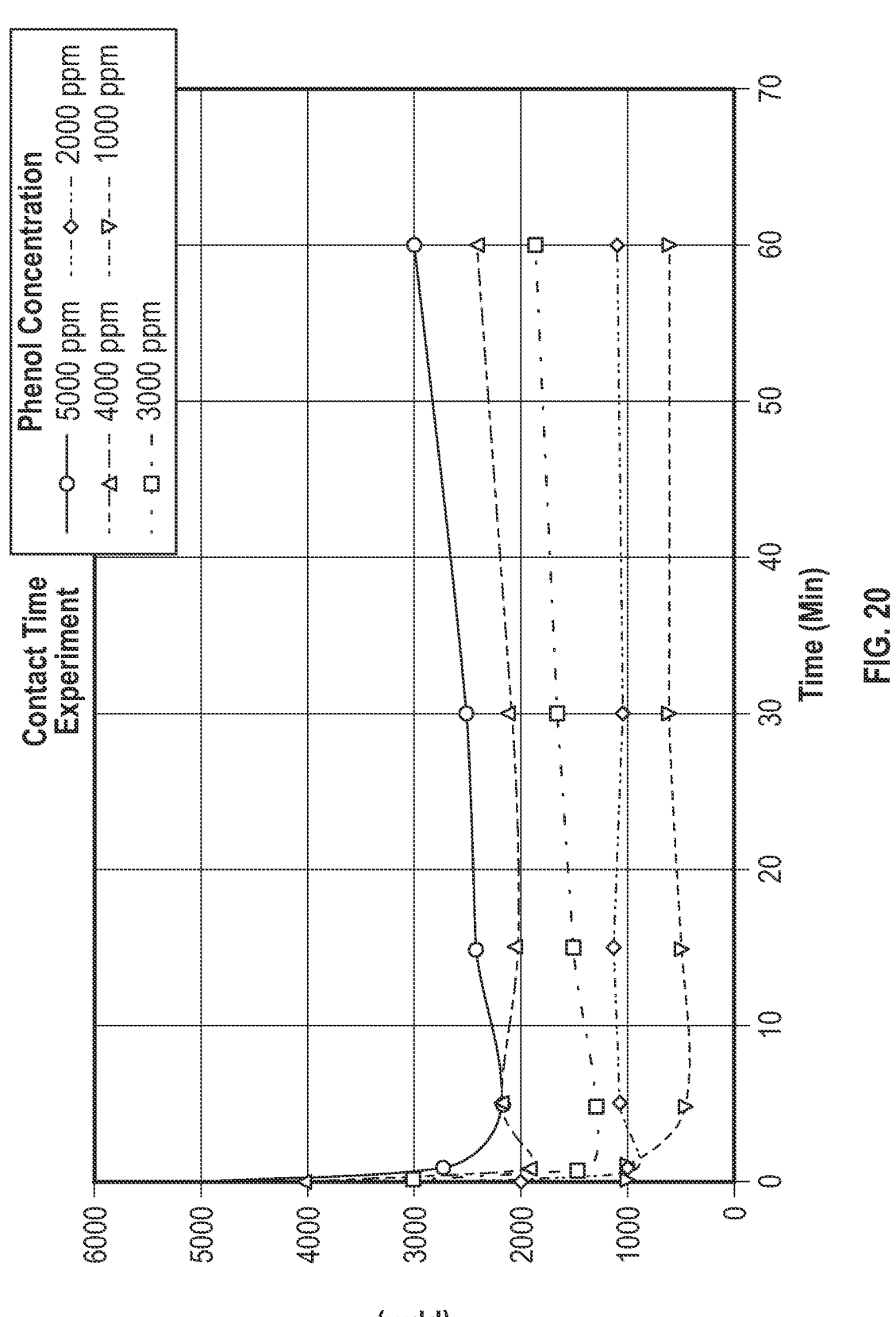
FIG. 20 is a plot of phenol concentration of a solution containing the aluminum-modified activated carbon (EXAMPLE 2) with respect to time, based on different initial phenol concentrations in accordance with one or more embodiments.

The relationship between the phenol concentration in the solution containing the Al—SO$_3$-AC of EXAMPLE 2 (with the initial phenol concentrations of 1000, 2000, 3000, 4000 and 5000 ppm) with respect to time is shown in FIG. 20. The data points were obtained from the phenol solutions containing Al—SO$_3$-AC used in the phenol adsorption characterization experiments described previously. FIG. 20 shows that at an initial phenol concentration above 2000 ppm, optimum adsorption of phenol is achieved one minute after the start of the experiment. However, if the initial phenol concentration is below 2000 ppm, optimum adsorption of phenol is obtained after five minutes. At 1000 ppm, no additional adsorption was observed beyond the first minute after the start of the experiment.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke means-plus-function for any limitations of any of the claims herein, except for those in which the claim expressly uses the words 'means for' together with an associated function.

What is claimed is:

1. A surface-modified activated carbon comprising:
activated carbon;
a plurality of sulfonate groups having a general formula —SO$_3$; and
a plurality of metal atoms comprising a plurality of aluminum atoms, a plurality of iron atoms or combinations thereof,
wherein:
each of the plurality of sulfonate groups is chemically bonded to a surface of the activated carbon,
each of the plurality of metal atoms is independently chemically bonded to at least one of the plurality of sulfonate groups, and
the surface-modified activated carbon has a net positive charge.

2. The surface-modified activated carbon of claim 1, wherein the surface-modified activated carbon comprises sulfur in an amount of from 0.5 to 5.0 wt %.

3. The surface-modified activated carbon of claim 1, wherein the surface-modified activated carbon comprises metal in an amount of from 0.5 to 5.0 wt %.

4. The surface-modified activated carbon of claim 1, wherein a surface area of the surface-modified activated carbon is in a range from 1000 to 2500 m$^2$/g.

5. The surface-modified activated carbon of claim 1, wherein each of the plurality of metal atoms is chemically bonded singly to one of the plurality of sulfonate groups.

6. The surface-modified activated carbon of claim 1, wherein the plurality of metal atoms consists of the plurality of aluminum atoms in an amount of from 0.5 wt % to 5.0 wt %.

7. A method for producing a surface-modified activated carbon comprising:
mixing activated carbon with a sulfur-containing compound comprising a sulfonate group;
chemically bonding each of the sulfonate group to a surface of the activated carbon to produce sulfonated activated carbon;
combining the sulfonated activated carbon with a solution containing a plurality of metal atoms; and chemically bonding each of the plurality of metal atoms independently with at least one of the sulfonate group of the sulfonated activated carbon to produce the surface-modified activated carbon,
wherein:
the surface-modified activated carbon comprises:
the activated carbon;
the plurality of sulfonate groups having the general formula —SO$_3$; and
the plurality of metal atoms comprising a plurality of aluminum atoms, a plurality of iron atoms or combinations thereof,
each of the plurality of sulfonate groups is chemically bonded to the surface of the activated carbon,
each of the plurality of metal atoms is independently chemically bonded to at least one of the plurality of sulfonate groups, and
the surface-modified activated carbon has a net positive charge.

8. The method of claim 7, wherein chemically bonding each of the plurality of sulfonate groups to the surface of the activated carbon is conducted at a temperature in a range from 100° C. to 150° C.

9. The method of claim 7, wherein the sulfur-containing compound is sulfuric acid.

10. The method of claim 7, wherein the solution containing the plurality of metal atoms comprises methanol and aluminum chloride.

11. The method of claim 7, wherein chemically bonding each of the plurality of metal atoms independently with at least one of the plurality of sulfonate groups is conducted at a temperature in a range from 5° C. to 50° C.

12. The method of claim 7, further comprising washing the sulfonated activated carbon with a washing solvent.

13. The method of claim 7, further comprising drying the sulfonated activated carbon.

14. The method of claim 7, wherein mixing the activated carbon with the sulfur-containing compound and chemically bonding each of the plurality of sulfonate groups to the surface of the activated carbon are conducted under a nitrogen blanket.

15. The method of claim 7, wherein chemically bonding each of the plurality of metal atoms independently with at least one of the plurality of sulfonate groups is chemically bonding each of the plurality of metal atoms singly with one of the plurality of sulfonate groups of the sulfonated activated carbon.

16. A method for removing an impurity in a subterranean well, the method comprising:
introducing a surface-modified activated carbon into the subterranean well containing a produced water comprising the impurity;
contacting the impurity with the surface-modified activated carbon; and
adsorbing the impurity with the surface-modified activated carbon,
wherein the surface-modified activated carbon comprises:
activated carbon;
a plurality of sulfonate groups having a general formula —SO$_3$; and
a plurality of metal atoms comprising a plurality of aluminum atoms, a plurality of iron atoms or combinations thereof,
wherein:
each of the plurality of sulfonate groups is chemically bonded to a surface of the activated carbon, and each of the plurality of metal atoms is independently chemically bonded to at least one of the plurality of sulfonate groups, and the surface-modified activated carbon has a net positive charge.

17. The method of claim 16, wherein the impurity is a polar organic compound.

18. The method of claim 17, wherein the polar organic compound is a phenolic compound.

19. The method of claim 16, wherein contacting the impurity with the surface-modified activated carbon and adsorbing the impurity with the surface-modified activated carbon is conducted for a duration in a range from 1 minutes to 60 minutes.

* * * * *